(12) United States Patent  
Ng

(10) Patent No.: US 8,117,500 B2  
(45) Date of Patent: Feb. 14, 2012

(54) SYSTEMS AND METHODS FOR IDENTIFYING A RELATIONSHIP BETWEEN MULTIPLE INTERRELATED APPLICATIONS IN A MAINFRAME ENVIRONMENT

(75) Inventor: Wang Fai Ng, Tuen Mun (HK)

(73) Assignee: Accenture Global Services GmbH, Schaffhausen (CH)

( * ) Notice: Subject to any disclaimer, the term of this patent is extended or adjusted under 35 U.S.C. 154(b) by 268 days.

(21) Appl. No.: 12/453,161

(22) Filed: Apr. 30, 2009

(65) Prior Publication Data

US 2010/0281307 A1 Nov. 4, 2010

(51) Int. Cl.  
*G06F 11/00* (2006.01)

(52) U.S. Cl. .................... 714/38.1; 714/26; 703/22

(58) Field of Classification Search .............. 714/26, 714/38.1; 709/223, 224; 703/22  
See application file for complete search history.

(56) References Cited

U.S. PATENT DOCUMENTS

| | | | |
|---|---|---|---|
| 6,289,368 B1 * | 9/2001 | Dentler et al. | 718/101 |
| 7,296,194 B1 * | 11/2007 | Lovy et al. | 714/57 |
| 2004/0049565 A1 * | 3/2004 | Keller et al. | 709/223 |
| 2008/0065928 A1 * | 3/2008 | Suzuki et al. | 714/3 |

OTHER PUBLICATIONS

EPO Search Report dated Jul. 28, 2010, for European Patent Application Serial No. 10 00 4601, filed Apr. 30, 2010 with priority date of Apr. 30, 2009 (7 pages total).

* cited by examiner

*Primary Examiner* — Yolanda L Wilson  
(74) *Attorney, Agent, or Firm* — Finnegan, Henderson, Farabow, Garrett & Dunner, L.L.P.

(57) ABSTRACT

Systems and methods are provided for identifying a relationship between multiple interrelated applications running in a mainframe environment. A repository is created to store information describing the multiple interrelated applications from the mainframe environment. A target application among the multiple interrelated applications is identified, and a frequency and a dependency relationship between the application and the multiple interrelated applications is determined. The relationship is displayed via a user interface. The relationship may be used to identify a cause of a failure in a mainframe environment.

24 Claims, 16 Drawing Sheets

Theme: Ocean – View: Full

Matrix Reloaded beta

What matters is that whatever happened, happened for a reason.

Behind the Scenes | Wiki | Test Director | Sharepoint | Matrix Online

| All | Program | Job | Copybook | Table | Transaction |

BA4CHA12    [Search]

BA4CHA12 Uses – Children View

Views
◉ children  ○ descendants  ○ forward tree

BA4CHA12 uses the following children elements directly.

Calls — 810

- QB8C9900 (Routine to read entity file)
- QR4CDB0 (BATCH/DB2 error management)
- TC8C1220 (Dates batch process (routine equivalent to the online one TC6C2220))
- TC8C1990
- TC9C1500 (Access to the centers table (routine equivalent to the online one TC7C2500))

Includes — 820

- BAFCHA11 (Copy for branch clearing back date transaction)
- BAWCRPT (Copy for report)
- QBEC9900 (Commarea copy of the routine QB8C9900 that retrieves entity structure data from a file)
- QBEC999 (Commarea with entity data for communication among modules)
- QBECFQI (Input copy for QI lists formater program (QB4CFQI0))
- QGECPRN (Commarea with deferred printing routine)
- QIFCHSUM (Summary definition before execution)
- QRECDB2 (Errors DB2 management from batch. link area with routine QR4CDB0)
- TCEC1500 (Commarea TC9C1500)
- TCEC1750 (Commarea TC8C1220)
- TCEC1990 (Commarea TC8C1990)

---

Logged in as TACT213 - Logout

Information name: BA4CHA12 (BA)
category: program (KBCOBD)
desc: Clearing back date transaction performed by branch
version(#): 2008-11-25 (01.05)[P]
source code: browse | download

Uses calls: QB8C9900, QR4CDB0, TC8C1220, TC8C1990, TC9C1500
includes: BAFCHA11, BAWCRPT, QBEC9900, QBEC999, QBECFQI, QGECPRN, QIFCHSUM, QRECDB2, TCEC1500, TCEC1750, TCEC1990
views: children | descendants | tree

Used By parm: AAHA1207
views: parents | ancestors | tree

Search Related parm: AAHA1207
proc: BAJHA12
program: BA4CHA11, BG4CHBC7
open search result

FIG. 9

| Theme: Ocean – View: Full | Matrix Reloaded beta | Logged in as TACT213 - Logout |

I created the Matrix. I've been waiting for you.
Behind the Scenes | Wiki | Test Director | Sharepoint | Matrix Online

| All | Program | Job | Copybook | Table | Transaction |

| B308 | Search |

B308 Uses – Forward Tree View

Views
○ children ○ descendants ● forward tree

Tree Options
[show three levels] ☐ show copybooks ☑ show tables [Update]

- B308 – Uplift with new placement
  - BG1C3080 (transaction call) – Account cancellation for term deposit
    - BG7C3060 (call) – Account cancellation for term deposit
      - BG7C0230 (call) – Inquiry of dominant status of an account and other values of the master table
        - QA6CAUT (call) – Authorizations programming interface
        - BGDT010 (select) – AIO Relations
        - BGDT041 (select) – Master Accounts
      - BG7C5730 (call) – Debit / credit module for on-line
        - BG6CH750 (call) – FEM withdrawal validation
        - BG6CH780 (call) – FEM manual dormancy maintenance
      - BG7C5440 (call) – Routine for calculating of awl and aawl
      - BG7C5470 (call) – Routine for calculate of available balance
      - BG7C7400 (call) – Routine about the confirmation of SWIFT messages
      - BG8C7700 (call) – Calculate the next date statement
      - BG9C0270 (call) – Access to master or opening table to obtain the settlement method
      - BG9C0880 (call) – Withholding module
      - BG9C5710 (call) – Access to control table to retrieve dates
      - BG9C5760 (call) – Product data inquiry
      - BG9C7500 (call) – Routine for cancelling dormant notifications
      - BG9C9820 (call) – Insert modified data from BG/GP-GA on line TRX
      - BL7C5820 (call) – Codes inquiry module
      - BQ7C5830 (call) – Checks payment module
      - BR6C0250 (call) – Justification validation
      - BR6C5880 (call) – Client account code creation
      - QA6CAUT (call) – Authorizations programing interface
      - QG6CTUT (call) – Access to area of terminal-user-transaction
      - QG9CESA0 (call)
      - QR8CDDF (call)
      - QR8CFHA (call) – Check dates with DDMMYY or DDMMYYYY format
      - TC7C2200 (call) – National schedule
      - TC7C2800 (call) – Access to the foreign currency general data table from any application
      - TC8C0040 (call) – Calculation of an amount counter value according to input parameters
      - TC9C0980 (call) – Literal table access routine
      - TC9C1000 (call) – Access to the general data table to obtain information from the appropriate corporate table
      - WP8C0010 (call) – Products characteristics inquiry
        - BGDT006 (select) – Accounts Auxiliary
        - BGDT010 (select) – AIO Relations
        - BGDT041 (select) – Master Accounts
        - BGDT071 (select) – Entries (Client Accounts)
        - BGDT096 (select) – Entries (Clearing Accounts)

Information
name: B308
category: transaction
desc: Uplift with new placement

Uses
transaction calls: BG1C3080
views: children | descendants | tree

Search Related
parm: GAHFDCC1, GAHFDCC2
program: QA4CHA09, BG1C3050, BG4CHB27, BG1C3080, QA4CHAM0, BG7C6020, BG7C3050
open search result

FIG. 11

Theme: Ocean – View: Full                                                                                  Logged in as TACT213 - Logout

Matrix Reloaded beta
Choice, the problem is choice.
Behind the Scenes | Wiki | Test Director | Sharepoint | Matrix Online

| All | Program | Job | Copybook | Table | Transaction |

[ BGDT008 ]    [ Search ]

BGDT008 Used By – Ancestors View
— Views —
○ parents    ● ancestors    ○ reverse tree BGDT008 and all its ancestors are used by the following elements.
Ancestors are the parents recursively found beginning from root element BGDT008. In other words, the following elements use BGDT008 directly, or indirectly by its ancestors.

Inserted by
Proc
- BGA9001 (Dummy account request)

Program
- BG2C9010 (Define number of dummy accounts)
- BG4C9002
- BG4C9003 (Automatic replenishment)

Transaction
- B901 (Request of dummy account media)

Selected by
Jcl
- BGAH370 (DP03-090 AIO dummy accounts file)
- BGAH900 (Service linkage updates (DP14-020))
- BGAHAC1 (Additional dummy A/C request summary for xxx branc)
- BGAHB39 (Dummy account status maintenance report for xxx BR)
- BGAHBD6 (Cheque book printing summary)

Parm
- GAH37003
- GAH90003
- GAHAC103
- GAHAC1A3

Information
name: BGDT008
category: table
desc: Dummy Account Pool
source code: N/A

Used By
selected by: BG2C0010, BG2C8520,
BG2C8540, BG2C9020, BG2C9030,
BG2C9040, BG4CH370, BG4CH900,
BG4CHAC0, BG4CHAC1, BG4CHB39,
BG4CHBD2
inserted by: BG2C9010, BG4C9002,
BG4C9003
updated by: BG2C0010, BG2C9030,
BG2C9040, BG4C9002
views: parents | ancestors | tree

Search Related
parm: GAK05350
copybook: BGWCK050, BGGT008,
BGWCK002, BGWCK001
proc: BGJK050E, BGJK055E, BGJK053E
program: BG4C9002, BG2C9040,
BG2C8540, BG2C9030, BG2C8520,
BG4C9003, BG2C9020, BG4CHBD2,
BG2C9010, BG2C0010, BG4CHAC0,
BG4CH900, BG2C0010, BG4CHAC1,
BG4CHB39
open search result

SYSTEMS AND METHODS FOR IDENTIFYING A RELATIONSHIP BETWEEN MULTIPLE INTERRELATED APPLICATIONS IN A MAINFRAME ENVIRONMENT

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto: Copyright©2006-2009, Accenture Global Services GmbH, All Rights Reserved.

DESCRIPTION

1. Technical Field

This disclosure is directed to systems and methods for developing and maintaining an application in a mainframe environment, and more particularly, to systems and methods for identifying a relationship between multiple interrelated applications in a mainframe environment.

2. Background

Applications for use in large organizations, such as in core banking, insurance, and/or airline systems, are often developed, and then maintained, in mainframe environments. Large organizations often utilize applications in mainframe environments for bulk data processing, such as census, industry and consumer statistics, enterprise resource planning, financial transaction processing, etc. In developing, debugging, and employing these-applications, programmers and analysts employ numerous tools to identify problem areas associated with and/or errors generated by the applications. For example, an analyst may use a tool to examine the source code of one or more applications during a development or troubleshooting process to find the cause of a problem. The identification process may be complicated and difficult because mainframe applications often depend on and interrelate with other applications, programs, copybooks, batch jobs, routines, and/or calls, etc. In addition, various interrelated applications may utilize different databases and/or libraries.

There are some tools available to assist users in developing and troubleshooting applications in a mainframe environment, and these tools are generally useful during the development, testing, operations and maintenance phases of the application development process. Typically, to locate a problem in the mainframe environment, a user will first create a job (e.g., a program) that will run a search routine in the mainframe environment to find application(s) that have caused the problem in the mainframe. The search routine may or may not retrieve the application(s) that actually caused the problem in the mainframe environment. In the typical case, the user then needs to retrieve several other applications that interrelate with the first application found by the search, and examine each application in order to isolate and identify the exact application(s) that caused the problem. To do this, the user typically needs to use multiple screens to display the application data from the mainframe environment in order to correctly identify the different routines and/or jobs that are affected by and involved with the problem. This identification process is inefficient because the search may take a long time to run, may require manual adjustments, and the display of multiple applications on multiple isolated screens or windows provides no context or relational data to assist in understanding the problem.

Another problem that may occur during the application development and maintenance process is that many common existing components may require re-development when different interrelated applications utilize different databases that vary in structure. In order to develop applications that work properly for such an intended environment, a developer typically must customize the common components to meet the requirements of the different databases. Customization of common components is another inefficiency suffered by conventional application development and maintenance processes.

Past efforts have been made to improve the efficiency of the application development and troubleshooting processes. For example, AllFusion Endevor Change Manager from CA, Inc., is a tool used in mainframe software development that provides searching capabilities on source code. However, AllFusion Endevor Change Manager has drawbacks in that it is often difficult to install and set up properly, and a simply search often takes a long time. In addition, a user may be required to employ numerous different tools and small programs and/or jobs in order to perform a simply search. Thus, the user may not obtain the information sought if the user is not familiar with the different functionalities of AllFusion Endevor Change Manager.

The systems and methods of the present disclosure improve upon the existing technology for developing, maintaining, and troubleshooting mainframe applications.

SUMMARY

In one embodiment, the present disclosure is directed to a method for identifying, in an organized fashion, a root cause of a failure in a mainframe environment that is running a plurality of interrelated applications. The method may be implemented using a computer system. The method may include creating a repository storing information describing the plurality of interrelated applications from the mainframe environment, using the computer system, and identifying an application included in the plurality of interrelated applications that is associated with the failure in the mainframe environment. The method may also include determining a relationship between the application and the plurality of interrelated applications, and displaying the relationship via a user interface. The method may further include identifying the root cause of the failure from the relationship.

Accordingly, embodiments consistent with the principles of the present application provides an advanced and intuitive way of providing a user with information, which may also be referred to as information data, to detect one or more applications that are responsible for a failure in the mainframe environment. In some embodiments, the necessary information data is displayed, as may be seen in FIGS. 8 to 15, in a manner that allows a user to more easily and comprehensively understand the internal state of the system. In other words, as part of some embodiments, an improved graphical user interface may be established that provides the user with cognitive content in a way that assists the user in administering and/or configuring a system, particularly a system in a mainframe environment.

In another embodiment, the present disclosure is directed to a system for identifying, in an organized fashion, a root cause of a failure in a mainframe environment that is running a plurality of interrelated applications. The system may include a memory and a processor coupled to the memory.

The processor may be configured to create a repository storing information describing the plurality of interrelated applications from the mainframe environment, and to identify an application included in the plurality of interrelated applications that is associated with the failure in the mainframe environment. The processor may also be configured to determine a relationship between the application and the plurality of interrelated applications, and to display the relationship. The processor may further be configured to identify the root cause of the failure from the relationship.

In yet another embodiment, the present disclosure is directed to a method for identifying, in an organized fashion, a relationship between a plurality of interrelated applications in a mainframe environment. The method may be implemented using a computer system. The method may include creating a repository storing information describing the plurality of interrelated applications from the mainframe environment, using the computer system. The method may also include identifying a target application included in the plurality of interrelated applications in the mainframe environment, and determining a frequency and a dependency relationship between the application and the plurality of interrelated applications using the information in the repository. The method may further include displaying the relationship via a user interface.

It is to be understood that both the foregoing description and the following description are exemplary and explanatory only and are not restrictive of the invention, as claimed.

The accompanying drawings, which are incorporated in and constitute a part of this specification, illustrate exemplary embodiments of the invention and together with the description, serve to explain the principles of the invention.

BRIEF DESCRIPTION OF THE DRAWINGS

FIG. 9 illustrates an exemplary children view of search result that may be included in an exemplary embodiment of a user interface of a web-integrated framework;

FIG. 11 illustrates an exemplary (forward) tree view of search result that may be included in an exemplary embodiment of a user interface of a web-integrated framework;

FIG. 13 illustrates an exemplary ancestors view of search result that may be included in an exemplary embodiment of a user interface of a web-integrated framework;

FIG. 14 illustrates an exemplary (reverse) tree view of search result that may be included in an exemplary embodiment of a user interface of a web-integrated framework;

FIG. 15 illustrates an exemplary embodiment of an authentication interface for an exemplary embodiment of a web-integrated framework.

DETAILED DESCRIPTION

Reference will now be made in detail to the present exemplary embodiments of the invention; examples of which are illustrated in the accompanying drawings. Wherever convenient, the same reference numbers will be used throughout the drawings to refer to the same or like parts.

Figure 1:
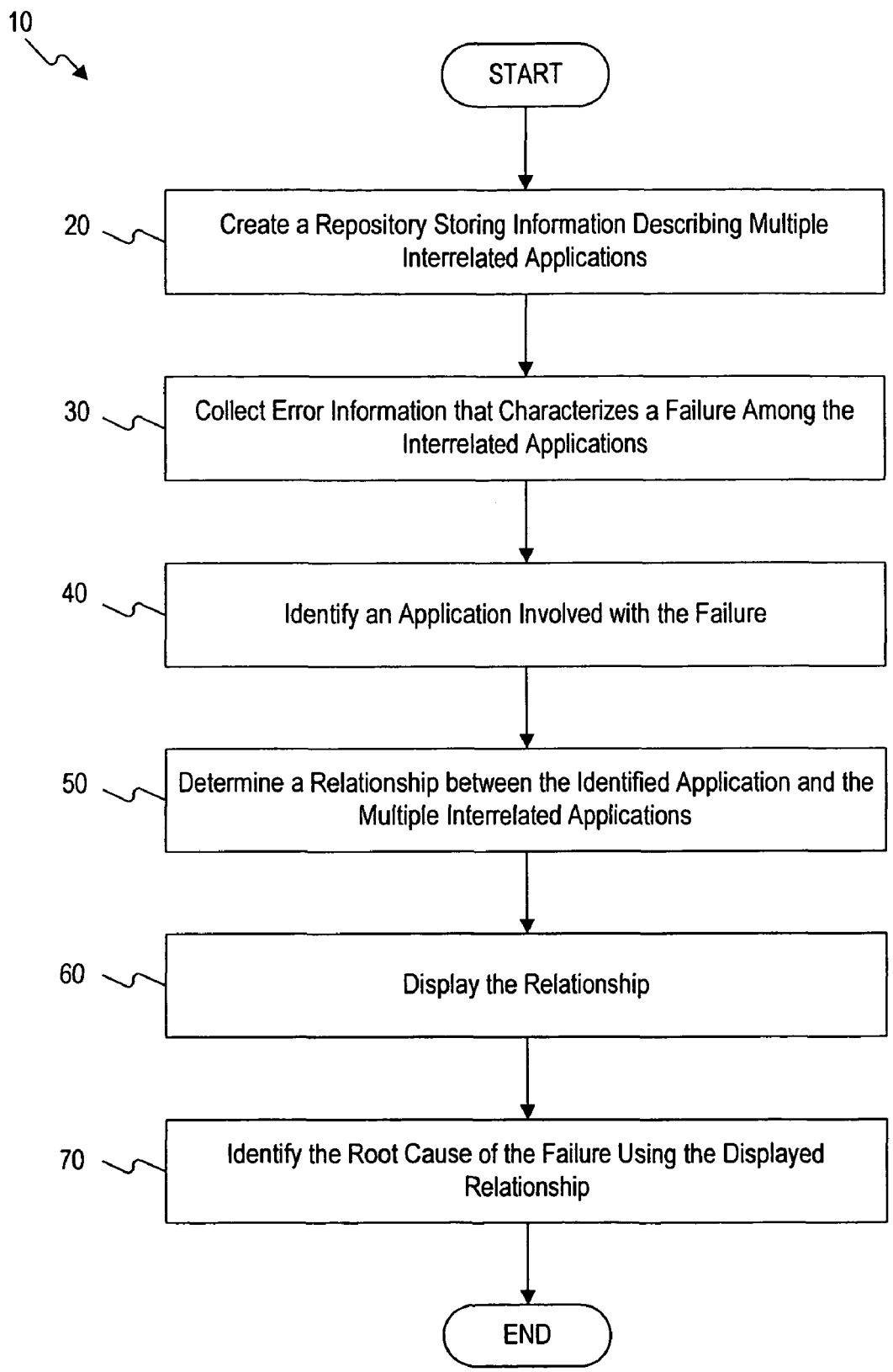
FIG. 1 illustrates an exemplary process of identifying a root cause of a failure in a mainframe environment.

FIG. 1 illustrates an exemplary process 10 of identifying a failure in a mainframe environment that is running several interrelated applications. It is understood that in this application, according to one or more embodiments, the term web-integrated framework may refer to a specific example of a mainframe environment. In other words, a mainframe environment may comprise a web-integrated framework or a mainframe environment may be a web-integrated framework. In the embodiment shown, at stage 20, the process creates a repository 220 (referring to examples in FIGS. 2, 4 and 5) to store information related to the interrelated applications. In some embodiments, repository 220 may store a description of each of the interrelated applications, which may include information identifying dependencies, shared data, relationships, etc., among interrelated applications. For example, a first application may be a dependent (e.g., child) of a second application if execution of the first application is initiated by execution of the second application. In other words, the second application is a parent of the first application. In some embodiments, the term "application" may be used to refer to a program, an application, a batch job, a transaction, a copybook, a database table, a portion of a software program that may be running in the exemplary mainframe environment, and/or a combination of any of the foregoing, etc.

In some embodiments, the description may also include information describing frequency relationships, such as how often an application is used by its parent application(s), how often an application uses its dependent application(s), and/or how often application(s) are updated, including information relating to scheduled updates.

In some embodiments, the description may also include information describing other resources used in the execution of each of interrelated applications, such as libraries and/or database tables, etc.

In some embodiments, repository 220 may include source code for some or all of the interrelated applications. It is contemplated that any updates or modifications of any of the interrelated applications may result in corresponding updates or modifications to information stored in repository 220.

At stage 30, the process collects or receives error information that characterizes a failure among the multiple interrelated applications. In some embodiments, the process may receive a failure log or an incident report from a mainframe computer that was running the interrelated applications. In other embodiments, the process may collect an error code, an error message, a memory dump, a register dump, status flags, and/or other data describing the failure and/or its cause(s). In some embodiments, the process may receive the failure log or the incident report from an incident report database (not shown) that may be utilized to store any failure or incident that may have occurred during the running of the interrelated applications on the mainframe computer.

As shown at stage 40, in the event of a failure of one or more applications among the multiple interrelated applications, the process identifies the one or more applications associated with the failure by processing information stored in repository 220. In one embodiment, the process uses the error information from stage 30 to identify the application(s) associated with the failure. For example, the process may identify the application(s) that was running (e.g., not idle) at the time of the failure as being associated with the failure. In another embodiment, the process may identify the application(s) whose source code contains or generates the error code, or the other data characterizing the failure, from stage 30.

For example, when a mainframe batch job fails, it may produce an error message. An example of the error message may be "ACCOUNTING SESSION CHANGED, EXECUTE TRANSACTION 'QG30' OR 'QG37.'" The process may use that error message, or a portion of it, to find the source code, and thus the application and environment, that generates the error messages. In one embodiment, a user may submit the error message to a search function in a web-integrated framework 100 and web-integrated framework 100 may find an application capable of outputting the error message. In another embodiment, the error message may be passed automatically from the mainframe to web-integrated framework 100.

In stage 50, information stored in repository 220 may be processed to determine a relationship(s) between the application(s) associated with the failure and multiple interrelated application(s). In some embodiments, the process may determine any relationship between the application(s) associated with the failure and their dependent application(s) (e.g., an application that a failed application uses), the relationship(s) between any application(s) that the application(s) associated with the failure depend from (e.g., an application that uses the failed application), and frequency information for the multiple interrelated application(s), or data shared between the application(s) associated with the failure and other applications.

Figure 8:
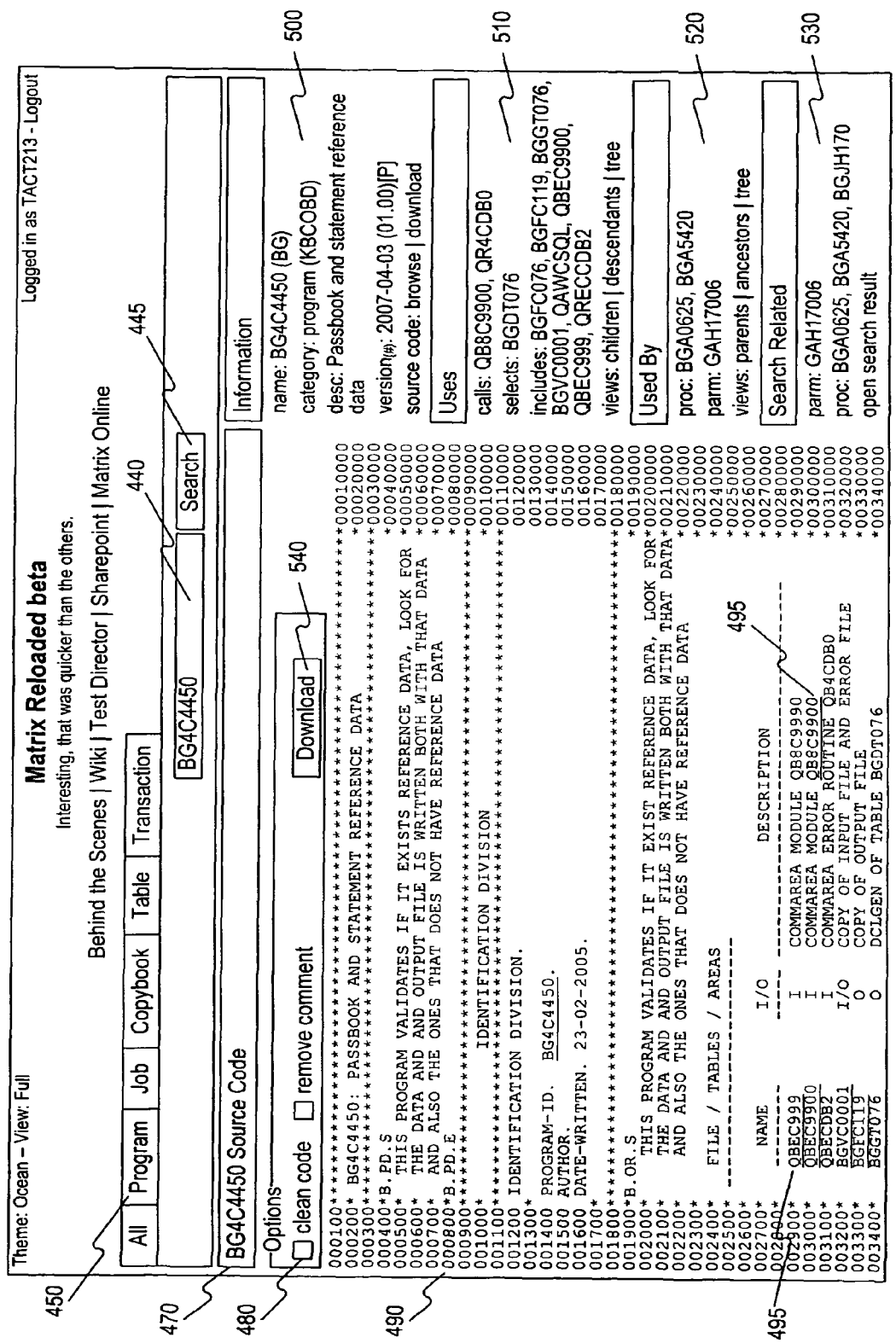
FIG. 8 illustrates an exemplary search result that may be included in an exemplary embodiment of a user interface of a web-integrated framework.

In stage 60, the relationship(s) may be displayed, for example, on a user interface 130 such that a user may view and easily comprehend the relationship(s). For example, once the application(s) that contains or generates the error message "ACCOUNTING SESSION CHANGED, EXECUTE TRANSACTION 'QG30' OR 'QG37'" is located, a user interface 130 may display the source code information and other relevant information related to the application(s) outputting the error message and the application's environment, for example, as shown in FIG. 8. In other words, user interface 130 may display an internal state of the application's environment. In some embodiment, user interface 130 may display details of a failure in the application's environment. In some embodiments, the relationship(s) between applications may be displayed as illustrated in FIGS. 9-14. In this example, the user may select different views, for example, as shown in FIGS. 9-14, to visualize information and the context of the failed batch job.

In stage 70, a root cause of the failure may be identified from the relationship(s) such that the root cause may be resolved. In some embodiments, the user may utilize the different views as shown in FIGS. 9-14 to view application(s) related to the application(s) outputting the error message, and utilize the views to identify the actual application(s) that is causing the failure.

After the root cause is identified, a user may modify an application to fix the problem. In some embodiments, the user may simulate an application as-is, or simulate any updates or modifications of any of the interrelated applications and may generate reports of such simulation using reporting module 180. The result of such simulation may assist the user in updating or modifying the interrelated applications, and may also assist the user in resolving the root cause. In other words, according to at least one embodiment in the present application, a computer aided tool is provided that allows a user to see and/or verify the outcome of possible changes to the system, without the necessity to install and/or execute a specific application(s) and/or an application(s) that has undergone specific configuration(s), for example.

Figure 2:
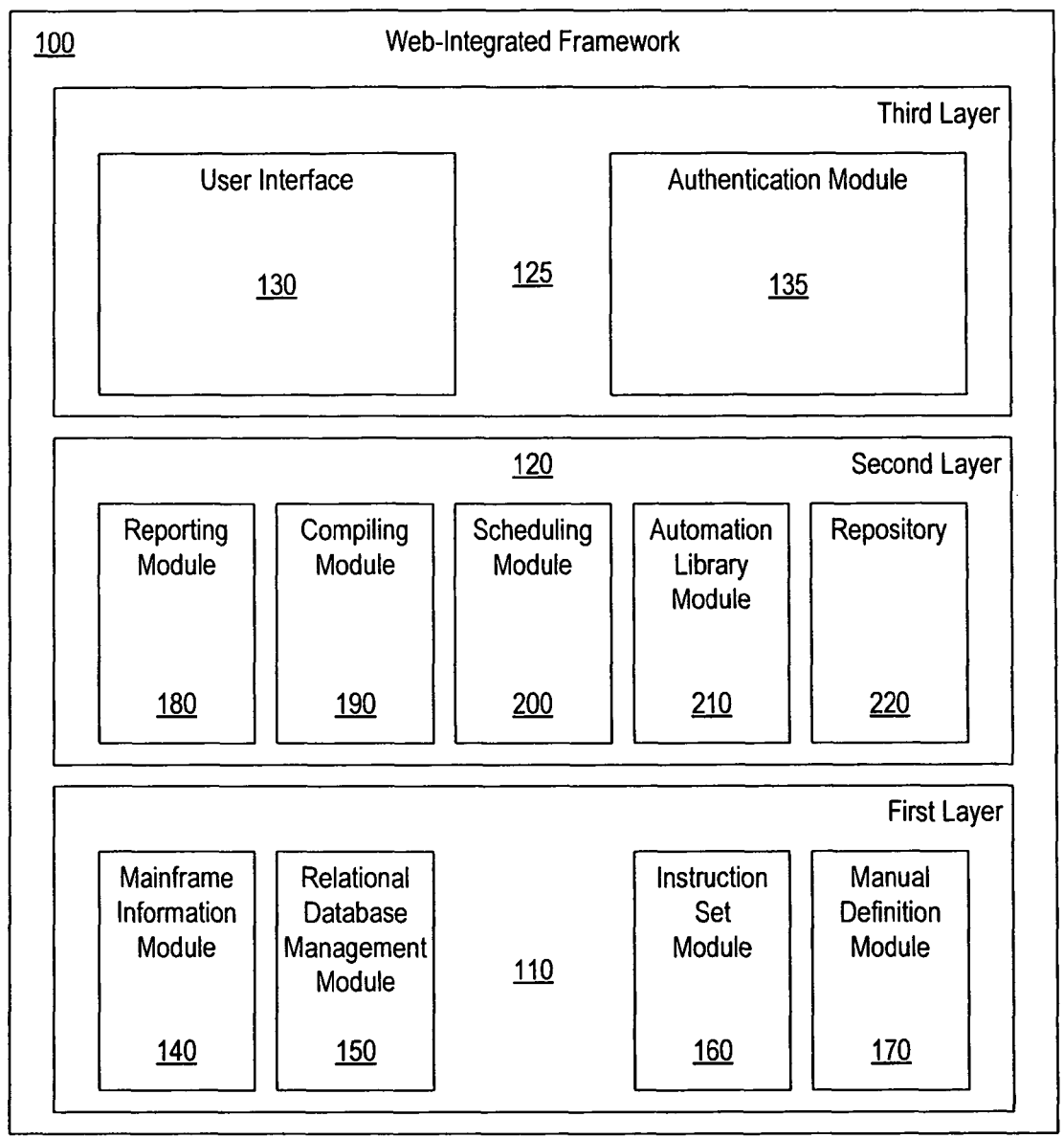
FIG. 2 is a block diagram illustrating an exemplary embodiment of a web-integrated framework.

FIG. 2 is a block diagram illustrating an exemplary embodiment of web-integrated framework 100. Web-integrated framework 100 may be used to implement process 10, in some embodiments. Web-integrated framework 100 may include a first layer 110, a second layer 120, and a third layer 125, for example. In some embodiments, first layer 110, second layer 120, and third layer 125 may be operably connected with each other, such that information (e.g., data) may be transmitted between first layer 110, second layer 120, and third layer 125. First layer 110 may include information associated with an exemplary mainframe environment, such as applications that run on the exemplary mainframe environment. In some embodiments, applications may be interrelated, such that performance of one application may affect the performance of other applications.

Referring to FIG. 2, first layer 110 may include a mainframe information module 140, a relational database management module 150, an instruction set module 160, and/or a manual definition module 170, for example. In some embodiments, first layer 110 may include information describing multiple interrelated applications that may be stored at stage 20 by process 10. First layer 110 may also include error information that characterizes a failure among the multiple interrelated applications that may be collected at stage 30 by process 10, for example. First layer 110 may assist a user in collecting information available in the exemplary mainframe environment that may be useful in developing and debugging applications running in the exemplary mainframe environment.

In the embodiment shown in FIG. 2, second layer 120 may include a reporting module 180, a compiling module 190, a scheduling module 200, an automation library module 210, and repository 220. In some embodiments, repository 220 may be created at stage 20 by process 10. Second layer 120 may be useful for processing the information available in the exemplary mainframe environment. In some embodiments, automation library module 210 may include automation libraries for Windows and/or IBM mainframe. It is contemplated that automation library module 210 may include libraries for other mainframe environments.

As shown, third layer 125 may include user interface 130 and an authentication module 135. Authentication module 135 may restrict access to web-integrated framework 100 by allowing users access only after their identities and/or access rights have been authenticated by authentication module 135. In some embodiments, authentication of a user may require a username and a password. Third layer 125 may provide an effective and efficient means that allows a user to access information available in the exemplary mainframe environment via a single interface.

In some embodiments, web-integrated framework 100 may be implemented using a variety of different development tools, such as Ruby programming language, PHP programming language, Ruby on Rails web framework, Subversion version control system, SQLite relational database management system, Ferret full-text search engine, Rake software build tool for batch tasks, erb template system for generating HyperText Markup Language (HTML), Structured Query Language (SQL), Job Control Language (JCL), and System Control Language (SCL), etc., WRQ Reflection IBM 3270 Terminal OLE for mainframe terminal automations, AutoIt for Windows automations, and Win32 Utils and win32ole for Windows automations and interactions with Excel, Word, and Reflection IBM, etc., to perform various development tasks. It is contemplated that other development tools may be use in addition to, and/or in place of any of the above-identified development tools to implement web-integrated framework 100.

Figure 3:
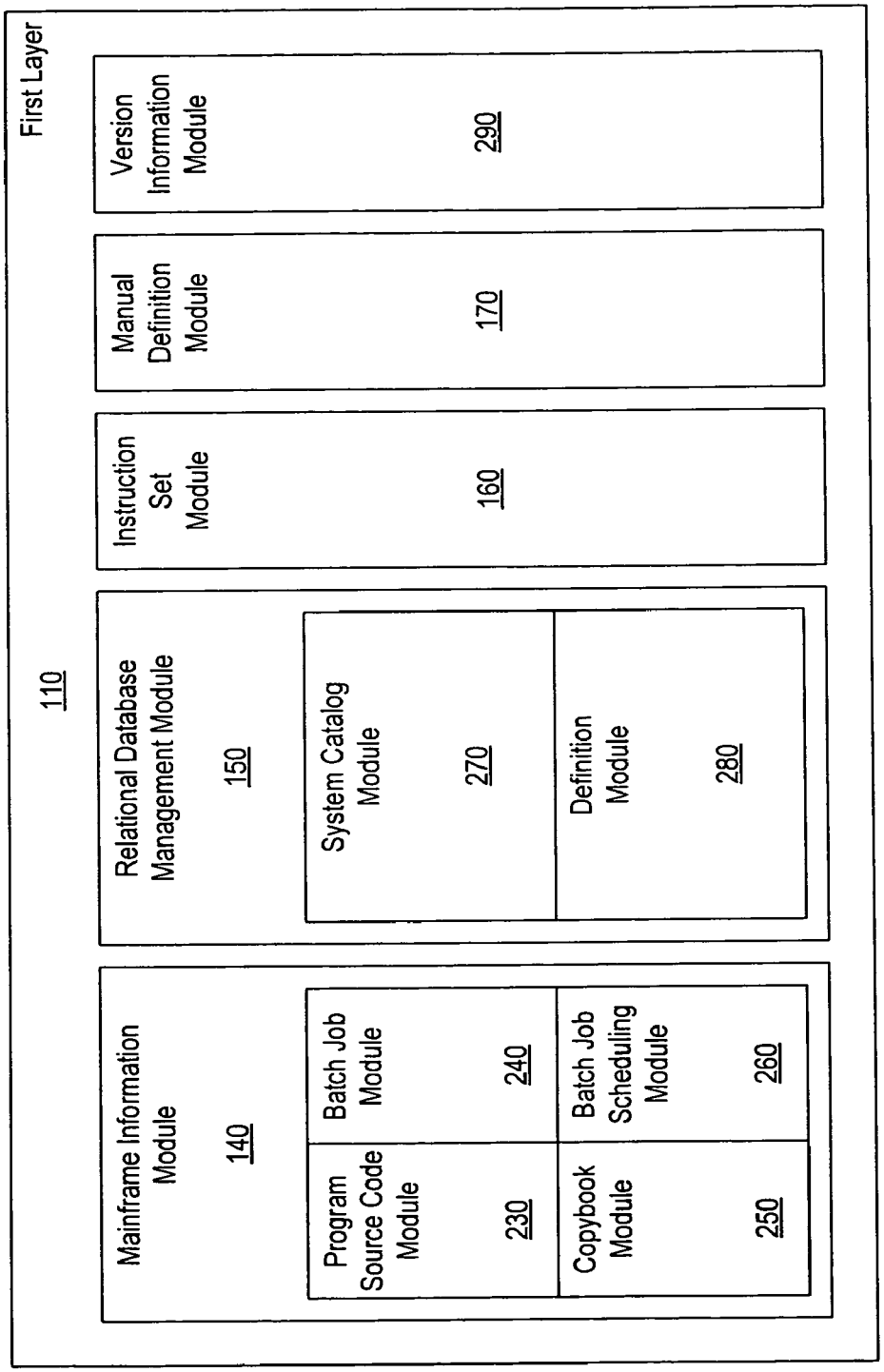
FIG. 3 is a block diagram illustrating various components that may be included in a first layer of an exemplary embodiment of a web-integrated framework.

FIG. 3 is a block diagram illustrating various exemplary components that may be included in first layer 110 consistent with some embodiments. As shown, mainframe information module 140 may include a program source code module 230, a batch job module 240, a copybook module 250, and a batch job scheduling module 260, for example. In some embodiments, program source code module 230, batch job module 240, and copybook module 250 may be in the form of mainframe libraries. In some embodiments, first layer 110 may also include other mainframe libraries (not shown).

In some embodiments, program source code module 230 may include source code for a batch program, an online transaction program, and/or a routine program. A program from program source code module 230 may select, insert, delete, or update a database table of an exemplary mainframe environment. In some embodiments, the program may include one or more copybooks with a common data structure. The program may also invoke routine program(s) in performing its function, for example.

In some embodiments, batch job module 240 may include one or more batch jobs. A batch job may invoke one or more batch programs. The batch job may also select, insert, delete, update, load or unload database table(s) of the exemplary mainframe environment.

In some embodiments, copybook module 250 may include one or more copybooks. A copybook may be a portion of the source code for a program. For example, the copybook may define a physical layout of program data, which may include files, database tables, transaction formats, and program communication area, etc.

In some embodiments, batch job scheduling module 260 may include information that may be used to define a sequence and/or a dependency of batch job(s). For example, a batch job scheduling software, such as Control-M batch flow, may be used in defining the sequence for executing multiple batch job(s) that may be included in batch job module 240.

Still referring to FIG. 3, in some embodiments, relational database management module 150 may include a system catalog module 270, and a definition module 280. System catalog module 270 may include metadata associated with definitions of system objects. In some embodiments, system catalog module 270 may include a DB2 system catalog, which may define a list of multiple DB2 tables used in the exemplary mainframe environment. In some embodiments, definition module 280 may include transaction definitions, such as transaction names, descriptions of transaction(s), and an online transaction program(s) for which a transaction may be invoked (e.g., called), etc. Relational database management module 150 may also include means (not shown) for a user to access data in a relational database (e.g., DB2) of the exemplary mainframe environment.

Instruction set module 160 may include bytecodes for assisting compiling module 190 in processing information (e.g., data) available in the mainframe environment, for example. In some embodiments, manual definition module 170 may include definitions set by a user of web-integrated framework 100, such as database triggers, flip-flop tables, mapping between jobs and functions, etc. In some embodiments, first layer 110 may include a version information module 290 for storing version information (e.g., data) related to applications used in the mainframe environment. A user of web-integrated framework 100 may include definitions to update and/or modify a table when a related table is updated and/or modified in the mainframe environment. The user may also include definitions to collect descriptions of various tables and their functions.

The foregoing description of information that may be included in various exemplary components of first layer 110 may be included in information stored at stage 20 by process 10, and/or may be included in information collected at stage 30 by process 10. In some embodiments, information that may be included in various exemplary components of first layer 110 may be included in repository 220.

Figure 4:
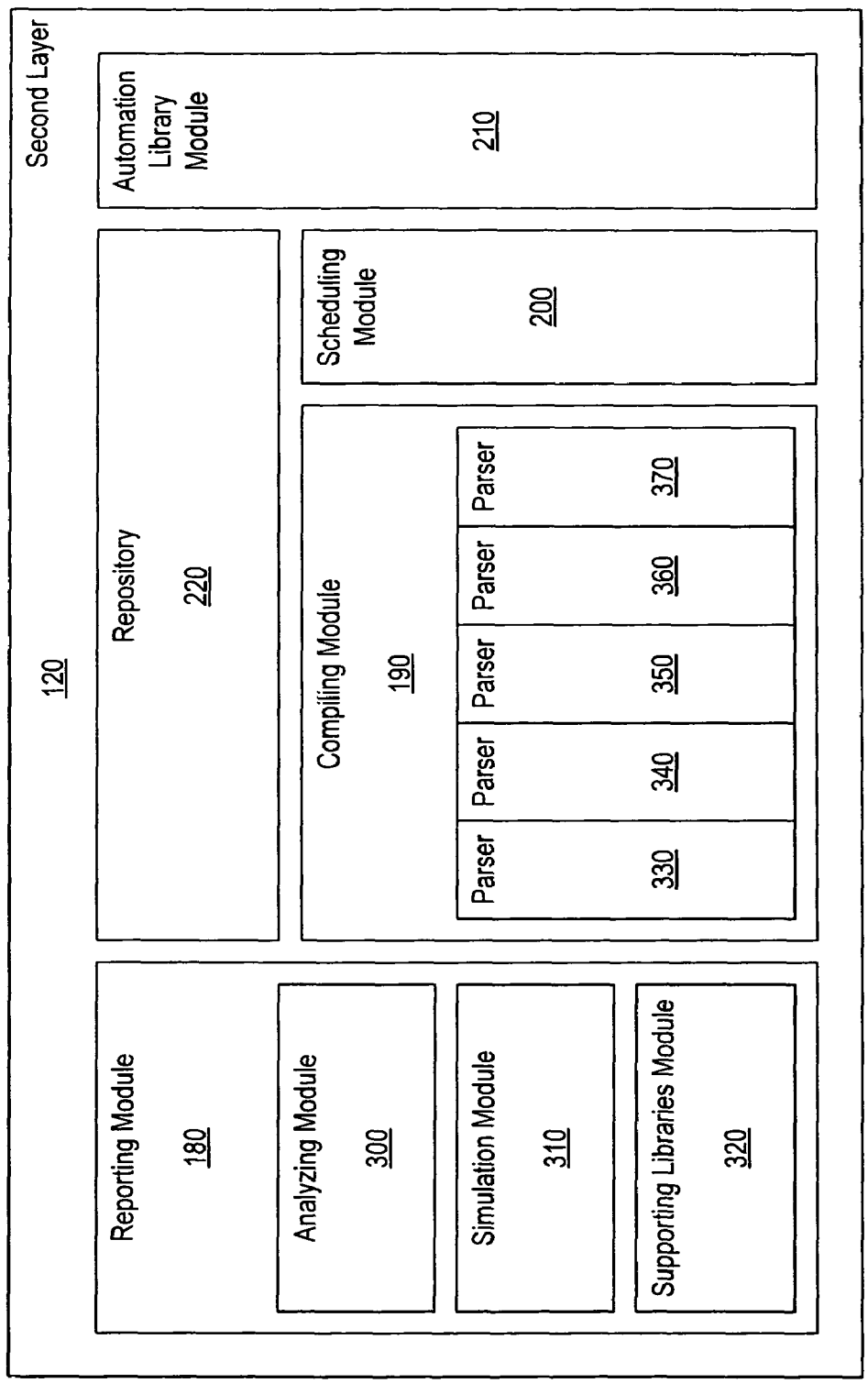
FIG. 4 is a block diagram illustrating various components that may be included in a second layer of an exemplary embodiment of a web-integrated framework.

FIG. 4 is a block diagram illustrating various exemplary components that may be included in second layer 120 consistent with some embodiments. As shown in FIG. 4, reporting module 180 may include an analyzing module 300, a simulation module 310, and a supporting library module 320. Simulation module 310, thus, may define a computer aided tool for the user, which allows the user to avoid carrying out the configuration, installation and/or execution of a number of applications. Analyzing module 300 may assist the user in analyzing information received from first layer 110, for example. Simulation module 310 may allow the user to simulate execution of different batch jobs, and scheduling of execution of different batch jobs, etc., that may be present in the mainframe environment.

In some embodiments, compiling module 190 may include multiple parsers 330-370. Parsers 330-370 may assist the user in parsing information received from first layer 110 via mainframe information module 140, relational database management module 150, instruction set module 160, manual definition module 170, and other components of first layer 110, for example. While compiling module 190 is described as including multiple parsers 330-370, in some embodiments, compiling module 190 may include other components that may facilitate the compilation of information received from first layer 110.

Still referring to FIG. 4, in some embodiments, parser 330 may assist the user in parsing information received from mainframe information module 140, parser 340 may assist the user in parsing information received from relational database management module 150, parser 350 may assist the user in parsing information received from instruction set module 160, and parser 360 may assist the user in parsing information received from manual definition module 170. In other embodiments, parser 370 may assist the user in parsing information received from first layer 110 via one or more modules included in first layer 110. For example, first layer 110 may include information from different data structures. In some embodiments, each of parsers 330-370 may have schemas for the data structures so that they can identify the meaning of the information they are parsing. In some embodiments, parsers 330-370 may process the information so that the information received from first layer 110 may be stored in a uniform data structure in repository 220. It is contemplated that more or fewer components may be employed in assembling first layer 110. Similarly, more or fewer components may be employed in assembling second layer 120.

In some embodiments, scheduling module 200 may include tasks to be performed at a predetermined time period to retrieve information from an exemplary mainframe environment to, for example, update repository 220. These tasks may be scheduled to be performed daily or with different frequency whenever appropriate. In some embodiments, scheduling module 200 may include tasks to: download source code for program(s) and job(s), a batch job scheduler, and/or table definition(s), etc.; parse source code, and table definition(s), etc.; input relationship(s) information of the program(s) and job(s) into a relational database, which may be an implementation of repository 220; build an information retrieval library with full text index for keyword searching; import version information of multiple applications in the exemplary mainframe environment; import relational database management system catalog; import database triggers information; correct relationship(s) information related to flip-flop tables; load the relational database to memory and dump the memory to a binary file for faster server start up; migrate newly updated data for transmission to repository 220; expire server cache and reload updated data; generate report(s); and perform other maintenance tasks, etc.

Figure 5:
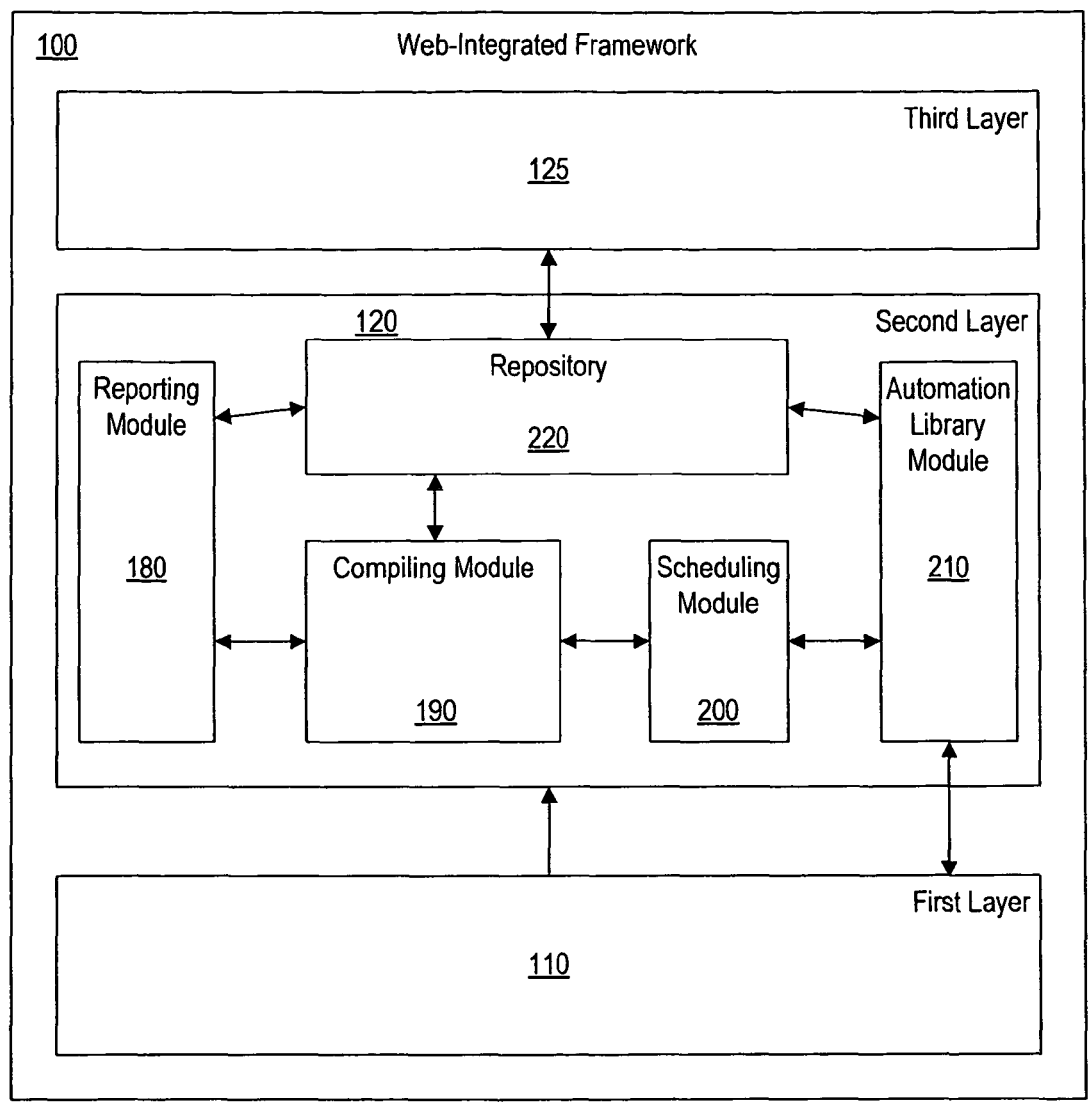
FIG. 5 is a block diagram illustrating relationships between various components of another exemplary embodiment of a web-integrated framework.

FIG. 5 is a block diagram illustrating relationships between various components of another exemplary embodiment of web-integrated framework 100. The arrows shown in FIG. 5 may indicate the direction data (e.g., information) may be transmitted within web-integrated framework 100. For example, a double-headed arrow may indicate that data (e.g., information) may be transmitted in both directions. As shown in FIG. 5, web-integrated framework 100 may include first layer 110, second layer 120, and third layer 125. For example, second layer 120 may include reporting module 180, compiling module 190, scheduling module 200, automation library module 210, and repository 220. In the embodiment shown, first layer 110 may be linked with second layer 120 such that information available in an exemplary mainframe environment may be transmitted to, or collected by, second layer 120. In some embodiments, information available in the exemplary mainframe environment may be transmitted to compiling module 190 via first layer 110, such that the information may be processed. In some embodiments, compiling module 190 may include a parsing module.

As illustrated in FIG. 5, the processed information from compiling module 190 may be transmitted to reporting module 180. A user may utilize reporting module 180 to generate reports regarding multiple applications being developed and maintained in the exemplary mainframe environment. Reporting module 180 may generate reports showing results produced by analyzing module 300 and/or simulation module 310. These reports may be transmitted from reporting module 180 to repository 220. In some embodiments, reporting module 180 may transmit results produced by analyzing module 300 and/or simulation module 310 to compiling module 190. In these embodiments, compiling module 190 may utilize results produced by analyzing module 300 and/or simulation module 310 in further processing the information received from first layer 110. For example, scheduling information from different batch jobs and/or applications, combined with execution log information from the different batch jobs and/or applications, may be used to simulate or project a new execution length after modifying an existing scheduling order of the different batch jobs and/or applications. This is useful for performance tuning of batch jobs and/or applications. In other words, the present application provides improved data processing, resulting in an improved manner of identifying applications that cause failure and/or resulting in an improved manner of identifying dependencies between applications that cause failure. In other embodiments, supporting libraries from supporting library module 320 may be transmitted to compiling module 190 to assist compiling module 190 in processing the data received from first layer 110.

In some embodiments, supporting library module 320 and automation library module 210 may include libraries for use in: mainframe login credential management, which may store login credential that may be needed to login to a mainframe computer; reliable File Transfer Protocol (FTP) client with parallel processing support; mainframe batch job submission, which may be based on a FTP client, for adding functionality to handle batch job submission such as, waiting for job to finish and parsing job result; English language tool for formatting a sentence with upper and lower case; and any other appropriate supporting and/or automation libraries.

Still referring to FIG. 5, the processed information from compiling module 190 may be transmitted to scheduling module 200. Scheduling module 200 may maintain daily scheduled updates and/or tasks associated with web-integrated framework 100. For example, in one embodiment, scheduling module 200 may maintain updates for multiple applications in the exemplary mainframe environment. In some embodiments, scheduling module 200 may maintain a list of tasks to be performed by the user of web-integrated framework 100. In some embodiments, scheduling module 200 may provide tasks to automation library module 210, which in turn, may retrieve the necessary information from first layer 110. The retrieved information may then be passed to scheduling module 200 to provide the necessary updates. These updates may be transmitted to compiling module 190 to be processed, for example. It is contemplated that scheduling module 200 may be operated manually, semi-automatically, automatically, or a combination thereof.

As shown in FIG. 5, processed information from compiling module 190 may be transmitted to repository 220 for storage therein. In some embodiments, additional information may be retrieved from repository 220 to facilitate compiling module 190 in processing information received from first layer 110. For example, reports and results generated by reporting module 180 may be transmitted to repository 220 for storage therein. In some embodiments, these reports and results may be useful in processing information received from first layer 110.

In some embodiments, web-integrated framework 100 may include a monitoring module (not shown). The monitoring module may utilize these reports and results in monitoring different programs, jobs, calls, and/or applications in an exemplary mainframe environment, such that the monitoring module may generate and/or transmit error notifications to a user of web-integrated framework of potential and/or actual errors that occur during the execution of the different programs, jobs, calls, and/or applications in the exemplary mainframe environment, for example.

It is contemplated that web-integrated framework 100 may also include an error notification module (not shown) for processing of error notifications that may be generated by the monitoring module. It is also contemplated that the error notification module and the monitoring module may be utilized to generate a list of application(s) associated with the potential and/or actual errors.

Also as shown in FIG. 5, information may be transmitted between repository 220 and automation library module 210, for example. In some embodiments, automation library module 210 may receive updates from scheduling module 200 and transmit these updates to repository 220 for storage therein. In other embodiments, automation library module 210 may retrieve information from repository 220 in order to identify the necessary information to be retrieved from first layer 110. For example, scheduling module 200 may transmit a request to automation library module 210 to receive any updates available from first layer 110. In some embodiments, automation library module 210 may receive reports generated by reporting module 180 which may be stored in repository 220. Automation library module 210 may then determine whether updates are available in first layer 110 based on these reports.

Figure 6:
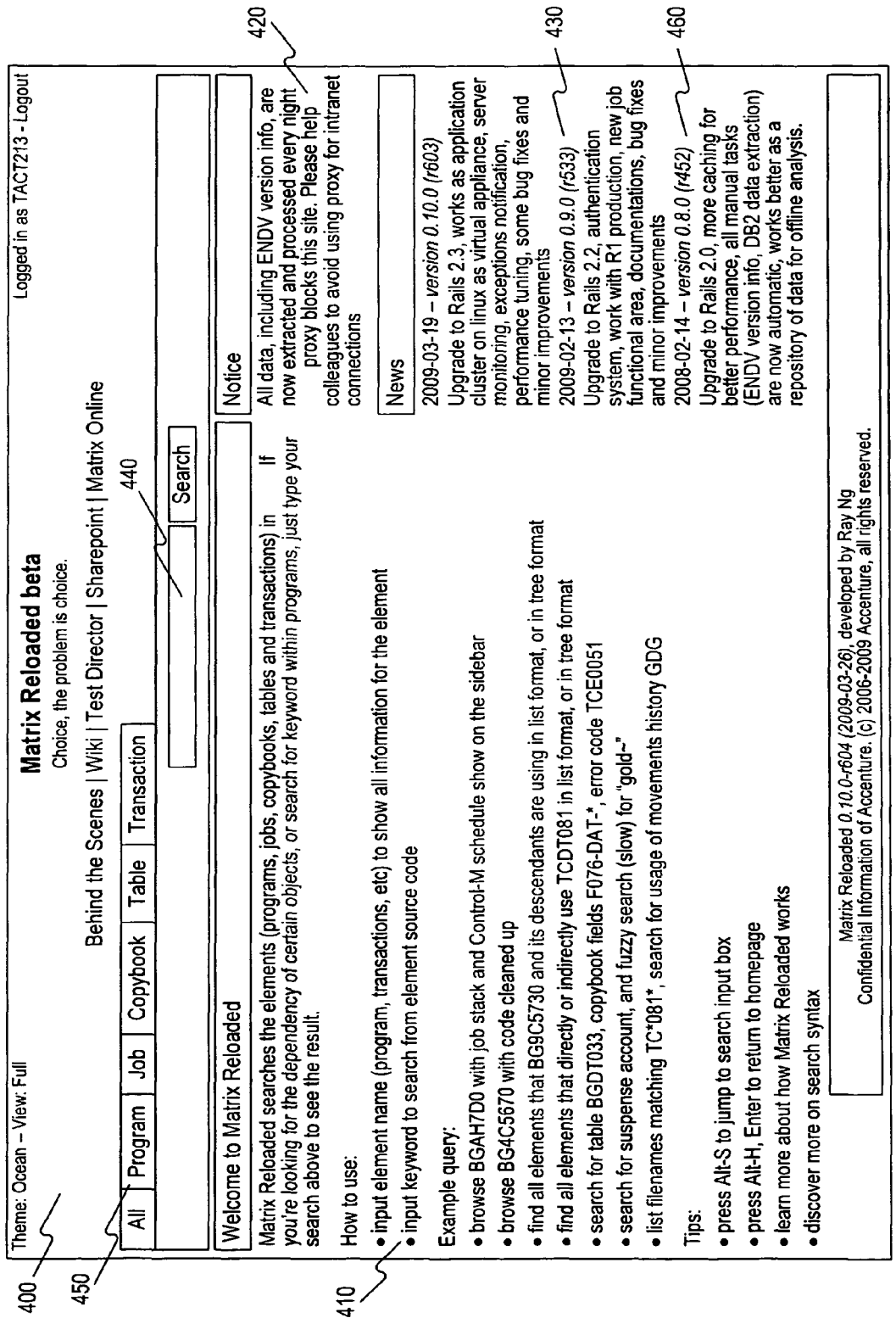
FIG. 6 illustrates an exemplary embodiment of a user interface of a web-integrated framework.

In some embodiments, information may be transmitted between repository 220 and user interface 130 (shown in the example of FIG. 6). For example, a user may request a report associated with a specific application that may be present in first layer 110. Web-integrated framework 100 may receive such a request via user interface 130. Web-integrated framework 100 may process the request and may transmit the requested report to repository 220, and the report may be presented to the user via user interface 130. In some embodiments, the report may be presented in formats such as Hyper Text Markup Language (HTML), Comma-Separated Values (CSV), JavaScript Object Notation (JSON), and Extensible Markup Language (XML), etc. It is contemplated that the report may be presented in any appropriate format chosen by a user of web-integrated framework 100. It is contemplated that a user may submit similar requests to web-integrated framework 100 for other information that may be available in first layer 110, such as source codes, version information, and relationship information among interrelated applications, etc.

FIG. 6 illustrates an exemplary embodiment of user interface 130. In the embodiment shown, user interface 130 may be presented in the form of a graphical interface 400. As shown in FIG. 6, graphical interface 400 may generally include three sections 410-430. A first section 410 may include general information such as information regarding how to use graphical interface 400, tips, and samples of searches that may be performed using graphical interface 400, for example. A second section 420 may include notices relating to announcements about graphical interface 400. A third section 430 may include release notes associated with multiple different versions of exemplary implementations consistent with the invention. In some embodiments, information presented in first section 410, second section 420, and/or third section 430 may be presented in the form of hyperlinks 460. Graphical interface 400 may also include a search field 440, where a user may input a query to search web-integrated framework 100. Also as shown in the example of FIG. 6, graphical interface 400 may include multiple tabs 450. Tabs 450 may allow a user to specify whether the user wishes to search web-integrated framework 100 for programs, jobs, copybooks, tables, transactions, or all of the above. While six tabs 450 are depicted in FIG. 6, it is contemplated that additional or fewer tabs may be presented in graphical interface 400.

Figure 7:
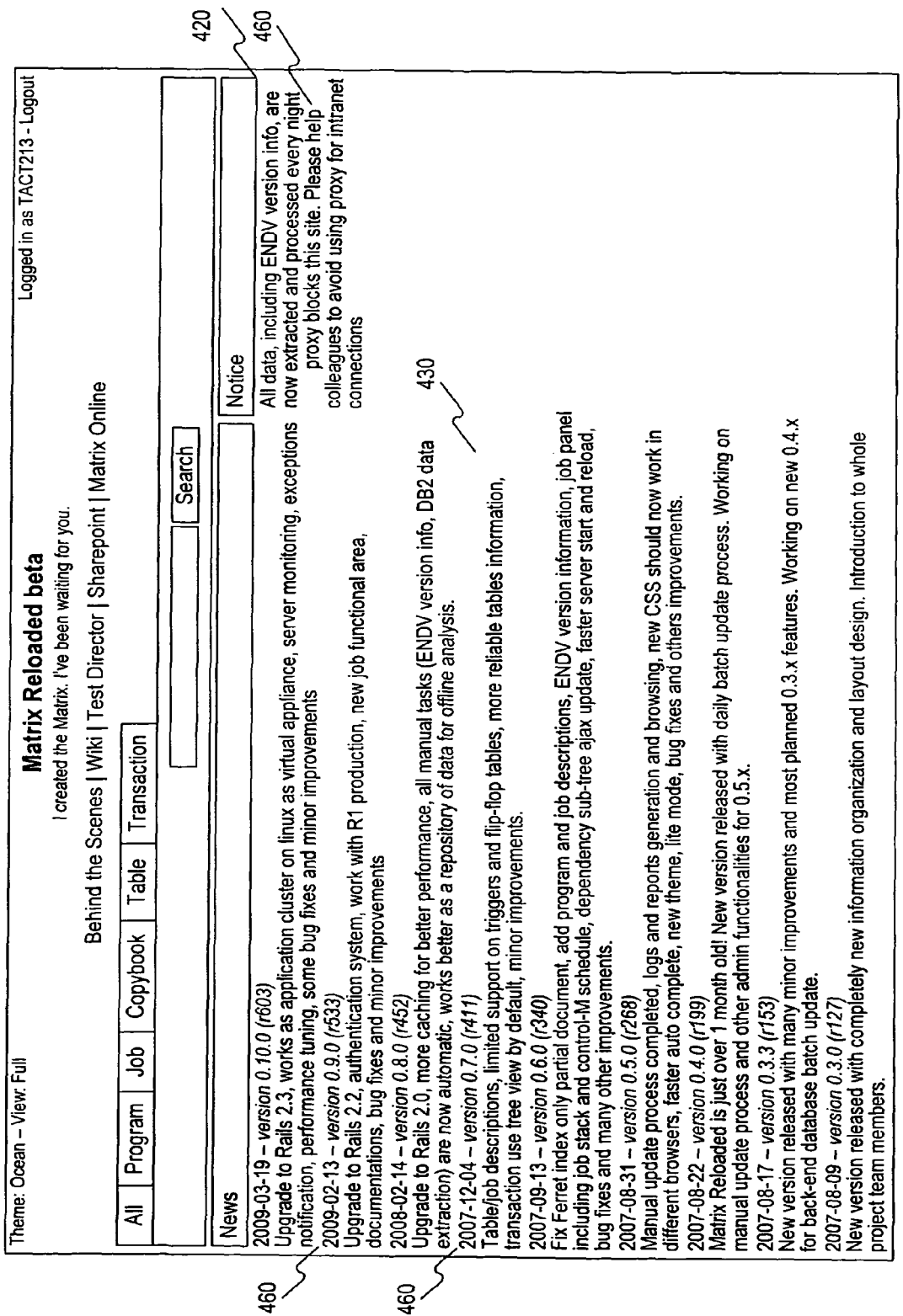
FIG. 7 illustrates exemplary information that may be included in an exemplary embodiment of a user interface of a web-integrated framework.

As illustrated in the example shown in FIG. 7, third section 430 may include a list of summaries for each release note, and each release note may be presented in the form of hyperlink 460. A user that wishes to access details of a release note may activate hyperlink 460 associated with the release note. Similarly, information presented in second section 420 relating to announcements may also be presented in the form of hyperlinks 460.

FIG. 8 shows an exemplary search result using graphical interface 400. In the example shown, a user may search web-integrated framework 100 for information related to an application program named "BG4C4450," (i.e., the target program). The target program may be, for example, a mainframe application or program that is associated with a failure that occurred on the mainframe. While the example demonstrates a exemplary search involving a target program, it is intended that a user may use graphical interface 400 to search web-integrated framework 100 for information relating to programs, applications, jobs, files, tables, transactions, copybooks, calls, and/or any other appropriate information that may be included in first layer 110. To begin, the user may enter the name of the target program (i.e., BG4C4450) in search field 440. In some embodiments, the user may use any appropriate input device, such as a keyboard, to enter query terms in search field 440. The user may submit the query by selecting (e.g., clicking) a search button 445. As shown in FIG. 8, a search of the name "BG4C4450" may produce a "source code" section 470, an "information" section 500, a "uses" section 510, an "used by" section 520, and a "search related" section 530. It is contemplated that additional sections containing additional information related to the target program may be presented via graphical interface 400.

"Source code" section 470 may include an "options" section 480 and a "code" section 490. In "options" section 480, a user may choose the way the source code of the target program is presented. In the embodiment shown, the user may choose to view a clean code version of the source code of the target program and/or to view a version of the source code of the target program without comments. The user may also have the option to download the source code of the target program by selecting (e.g., clicking) a "download" button 540, for example. "Download" button 540 may allow the user to download the source code of the target program in the user's preferred text editor, such as Notepad, or any other appropriate text editor. In some embodiments, "code" section 490 may include the actual text of the source code of the target program. In addition, "code" section 490 may include names 495 of files, tables, programs, and/or jobs, etc. that the target program may utilize in performing the program's function. In some embodiments, names 495 may be presented in the form of hyperlinks, such that the files, tables, programs, and/or jobs names 495 may be accessed by activating their respective hyperlinks.

In the embodiment shown in FIG. 8, "information" section 500 may include general information relating to the target program such as the name of the target program, a category of the target program, a description of the target program, and version information for the target program. In the embodiment shown, "information" section 500 may also include hyperlinks for a user to browse or download the source code of the target program. Also as shown in FIG. 8, "uses" section 510 may include resources that the target program may use in performing its function. These resources may include calls, programs, jobs, and/or copybooks, etc. In addition, "uses" section 510 may include hyperlinks that allows a user to review relationships, such as a hierarchical relationship, among resources that the target program may use. In some embodiments, the user may select from a "children" view, a "descendants" view, and a "(forward) tree" view. "Used by" section 520 may list resources that may use the target program in performing their functions. "Used by" section 520 may also include hyperlinks to display relationships among the resources that may use the target program. In some embodiments, the user may select from a "parent" view, an "ancestors" view, and a "(reverse) tree" view. "Search related" section 530 may include programs, calls, jobs, and/or routines, etc. that may be related to the target program. In some embodiments, "search related" section 530 may include a hyperlink to open a full text search result related to the target program.

"Uses" section 510, "used by" section 520, and "search related" section 530 may quickly inform a user of user interface 130 of the basic relationship of the target program with other related programs. The user can click on hyperlinks 460 of resources included in "uses" section 510, "used by" section 520, and "search related" section 530 and browse the resource.

Figure 10:
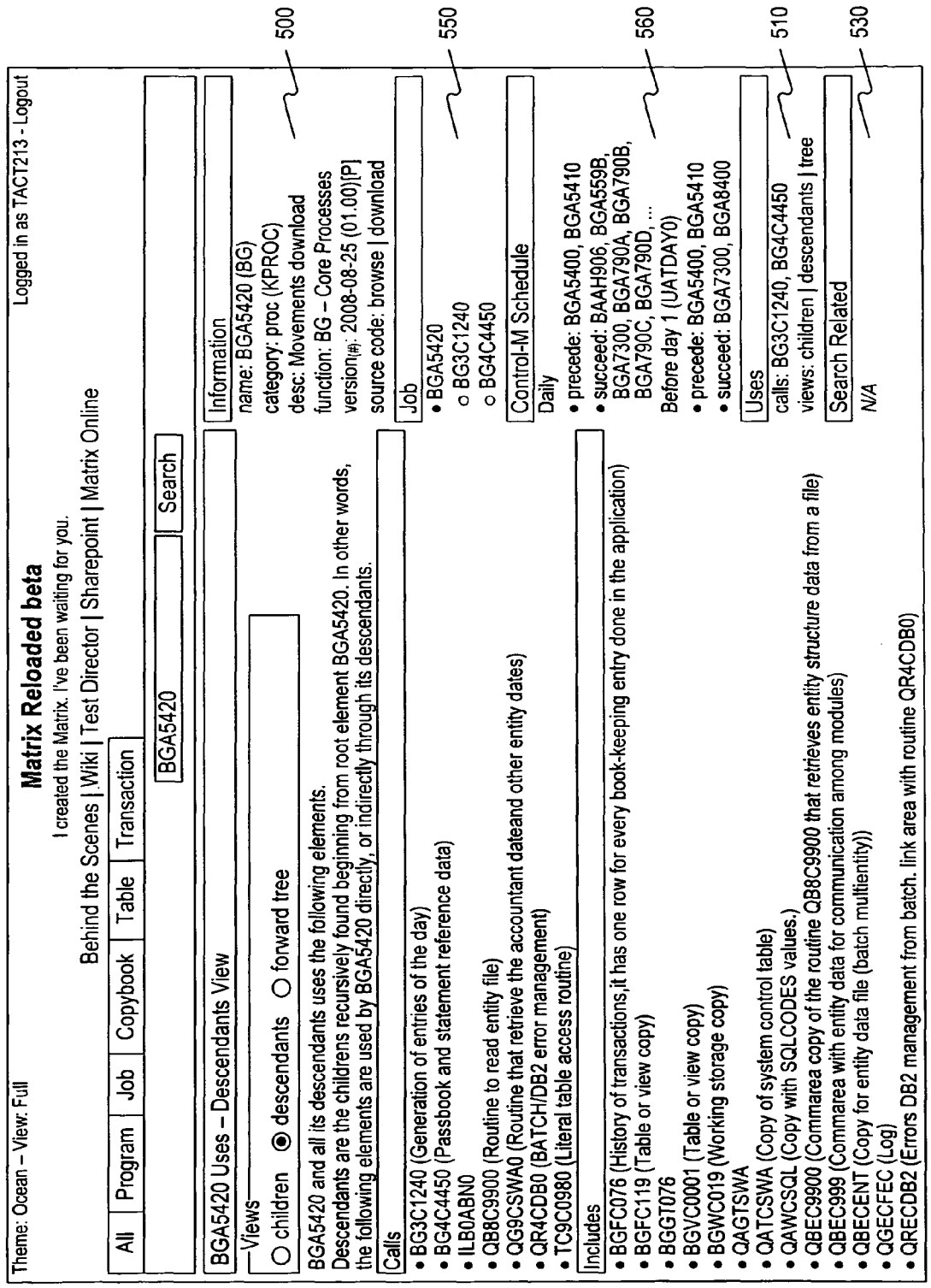
FIG. 10 illustrates an exemplary descendants view of search result that may be included in an exemplary embodiment of a user interface of a web-integrated framework.

FIGS. 9-11 show exemplary embodiments for each of the "children" view, the "descendants" view, and the "(forward) tree" view available in "uses" section 510. The "children" view of FIG. 9 shows a listing of elements used directly by a target program (e.g., BA4CHA12). As shown in FIG. 9, the elements used by the target program may be categorized and presented according to their respective categories. For example, in the embodiment shown, the elements are categorized into a "calls" section 810 and an "includes" section 820. In some embodiments, "calls" section 810 and "includes" section 820 may include hyperlinks 460 to each of the elements listed in "calls" section 810 and "includes" section 820, such that a user may access each of the elements by activating (e.g., clicking) the respective hyperlinks 460. In the embodiment shown, a brief description of the function of each of the elements may be displayed.

The exemplary "descendants" view of FIG. 10 shows a listing of elements used directly or indirectly by a target program (e.g., BGA5420). In some embodiments, graphical interface 400 may include a "job" section 550 and "scheduling" section 560. "Job" section 550 may include a list of jobs used by the target program, for example. In some embodiments, "scheduling" section 560 may include a list of programs, calls, jobs, and/or routines, etc. that may be used directly or indirectly by the target program. In some embodiments, "scheduling" section 560 may also include a list of programs, calls, jobs, and/or routines, etc. that may be scheduled for updates, and scheduling information for the programs, calls, jobs, and/or routines, etc. The "descendants" view may be useful in determining the children elements of each element of a target program, which is typically be extremely time-consuming and prone to error if the determination is performed manually. In addition, the complexity of the dependency between the target program and its elements may extend the time required for compiling the information shown in the "descendants" view manually.

The exemplary (forward) tree view of FIG. 11 shows a hierarchical relationship between the different calls, jobs, programs, tables, and/or transactions, etc. used by a target program (e.g., B308). In some embodiments, a user may have the option to select a level of details to be shown in the (forward) tree view. For example, in the embodiment shown, under tree option section 900, the user may select the option of showing three levels, such that the hierarchical relationship between the different resources used by the target program may be displayed in tree format and these resources may be expanded to three levels of details. In the embodiment shown, the expansion from a first level to a second level may be accomplished by clicking a folder 910. In some embodiments, tree option section 900 may also include a show copybook option 920 and a show table option 930. By selecting show copybook option 920, the (forward) tree view may show copybooks used by the target program. Similarly, by selecting show table option 930, the (forward) tree view may show tables used by the target program. In some embodiments, tree option section 900 may include an update button 940. A user selecting different options may submit his selection and update the (forward) tree view by clicking update button 940. While three levels of details are selected in the embodiment shown, it is contemplated that any appropriate number of levels of details may be implemented in web-integrated framework 100.

Figure 12:
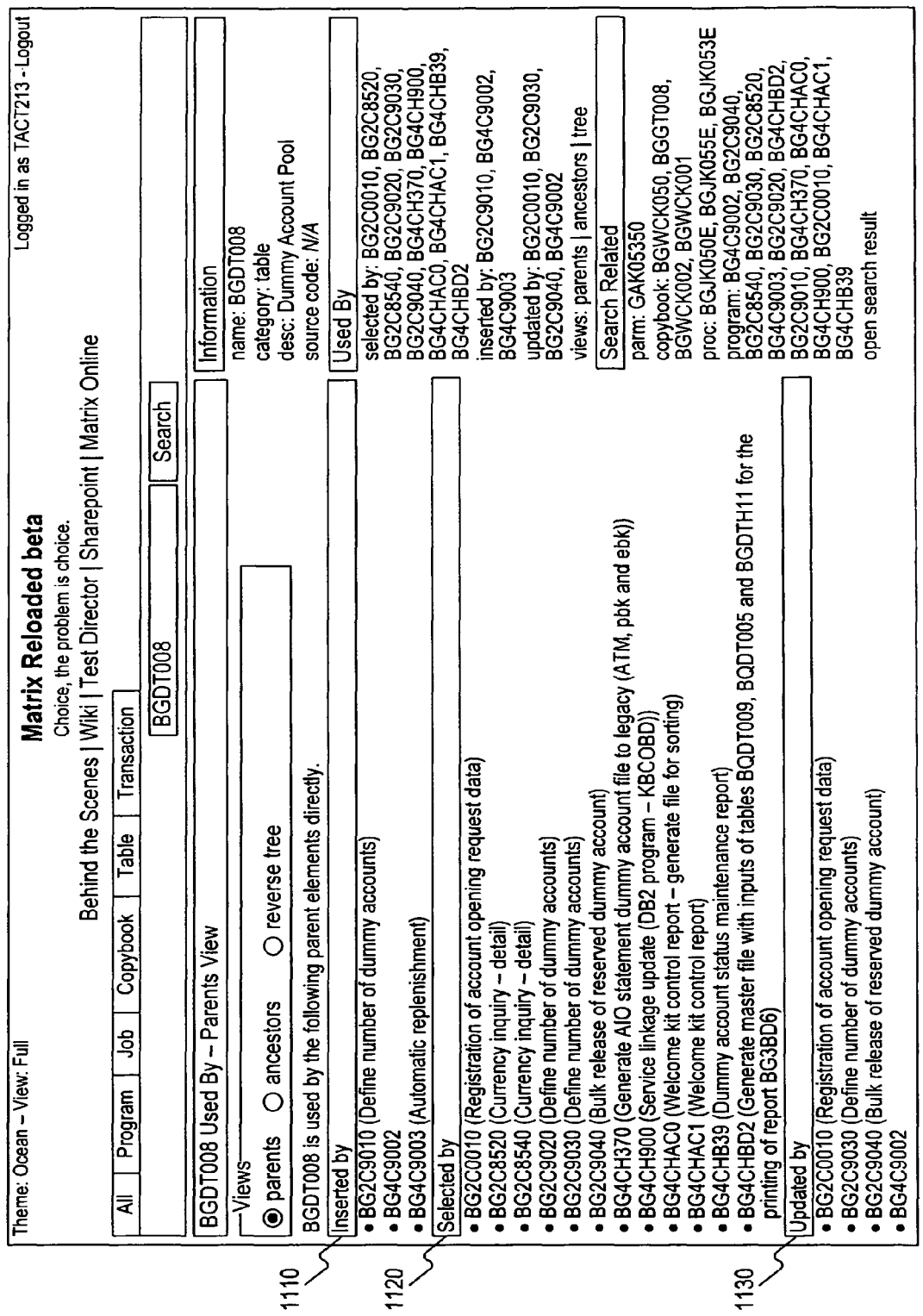
FIG. 12 illustrates an exemplary parents view of search result that may be included in an exemplary embodiment of a user interface of a web-integrated framework.
Figure 14:
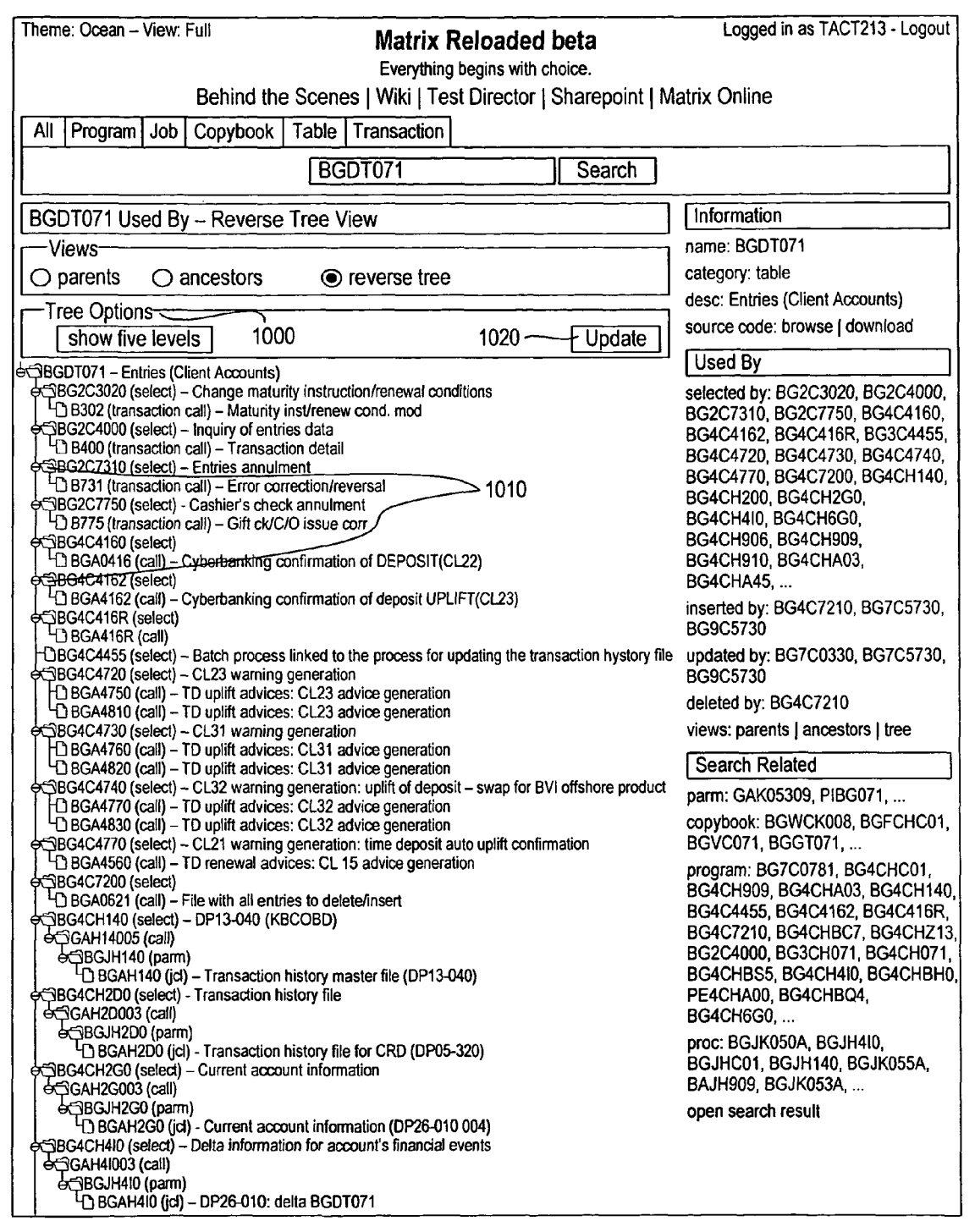

FIGS. 12-14 illustrate exemplary embodiments of the parents view, the ancestors view, and the (reverse) tree view available in "used by" section 520. The parents view of FIG. 12 shows a listing of elements that directly use a target program (e.g., BGDT008). As shown in FIG. 12, the elements using the target program may be categorized and presented according to their respective categories. For example, in the embodiment shown, the elements are categorized into an "inserted by" section 1110, a "selected by" section 1120, and an "updated by" section 1130.

The exemplary ancestors view of FIG. 13 shows a listing of elements that directly or indirectly use a target program (e.g., BGDT008).

The exemplary (reverse) tree view of FIG. 14 shows a hierarchical relationship among the different calls, jobs, programs, and/or transactions, etc. that may use a target program (e.g., BGDT071). In some embodiments, a user may have the option to select a level of details to be shown in the (reverse) tree view. For example, in the embodiment shown, under tree option section 1000, the user may select the option of showing five levels, such that the hierarchical relationship between the different resources used by the target program may be displayed in tree format and theses resource may be expanded to five levels of details. In the embodiment shown, the expansion from a first level to a second level may be accomplished by clicking a folder 1010. In some embodiments, tree option section 1000 may include an update button 1020. A user selecting different options may submit his selection and update the (reverse) tree view by clicking update button 1020. While five levels of details are selected in the embodiment shown, it is contemplated that any appropriate number of levels of details may be implemented in web-integrated framework 100. It is also contemplated that additional sections containing additional information related to the target program may be presented via graphical interface 400.

Figure 15:
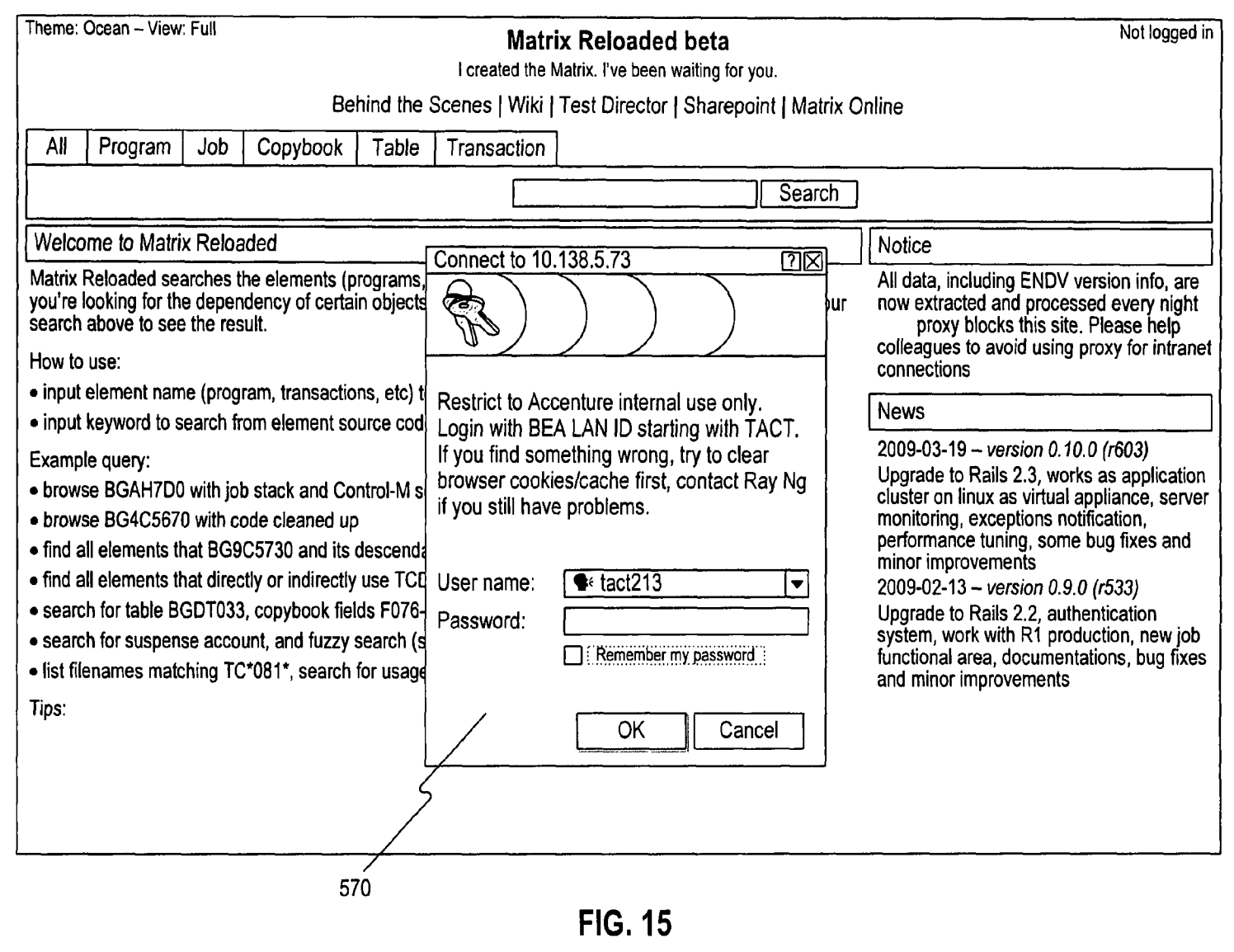

As shown in the embodiment of FIG. 15, authentication module 135 may employ an authentication interface 570. Authentication interface 570 may require a user to enter a username and a password before allowing the user to access web-integrated framework 100. For example, the user may be authenticated using OpenLDAP against Microsoft Active Directory implemented in the web-integrated framework 100. It is contemplated that other appropriate methods and applications for authenticating a user may be used. It is also contemplated that authentication module 135 may be pluggable, such that authentication module 135 may be a component separate from web-integrated framework 100, and that authentication module 135 may be included and removed from web-integrated framework easily. In some embodiments, authentication module 135 may also be modified, such that the user may be authenticated using a username and a password against a list of usernames and passwords stored in a database associated with web-integrated framework 100.

While the foregoing embodiments were often described in relation to a failure event, a user may employ similar methods and systems to perform routine maintenance or troubleshooting of applications in a mainframe environment. For example, a user may use web-integrated framework 100 to find information related to any target program. In addition, a user may user web-integrated framework 100 to simulate modification of any target program. By simulating modification of a target program without actually modifying the target program, a user may determine whether the intended modification may prove desirable. By simulating modification of the target program, the user may modify any target program after he achieves a desired result from the simulated modification. Further, a user may use web-integrated framework 100 in performing batch job dependency analysis, where the user may obtain a report from reporting module 180 showing inter-dependencies between different batch jobs that may be included in first layer 110. Utilizing web-integrated framework 100, a user may perform various other analysis, including batch job analysis, batch configuration analysis based on database access information, relational database management configurations extraction and automation analysis, batch job prioritization and performance tuning analysis, batch job work load analysis, possible batch job deadlock analysis, transactions database usage and scheduling for backup/recovery planning analysis, integration of batch execution statistics against job scheduling and job paths, relational database management planning analysis, batch simulation, and/or batch operation manual generation analysis, etc. The results of the various analyses may assist the user in identifying problem areas associated with and/or errors generated during the development or lifespan of applications in a mainframe environment and may improve the efficiency of the development process.

Figure 16:
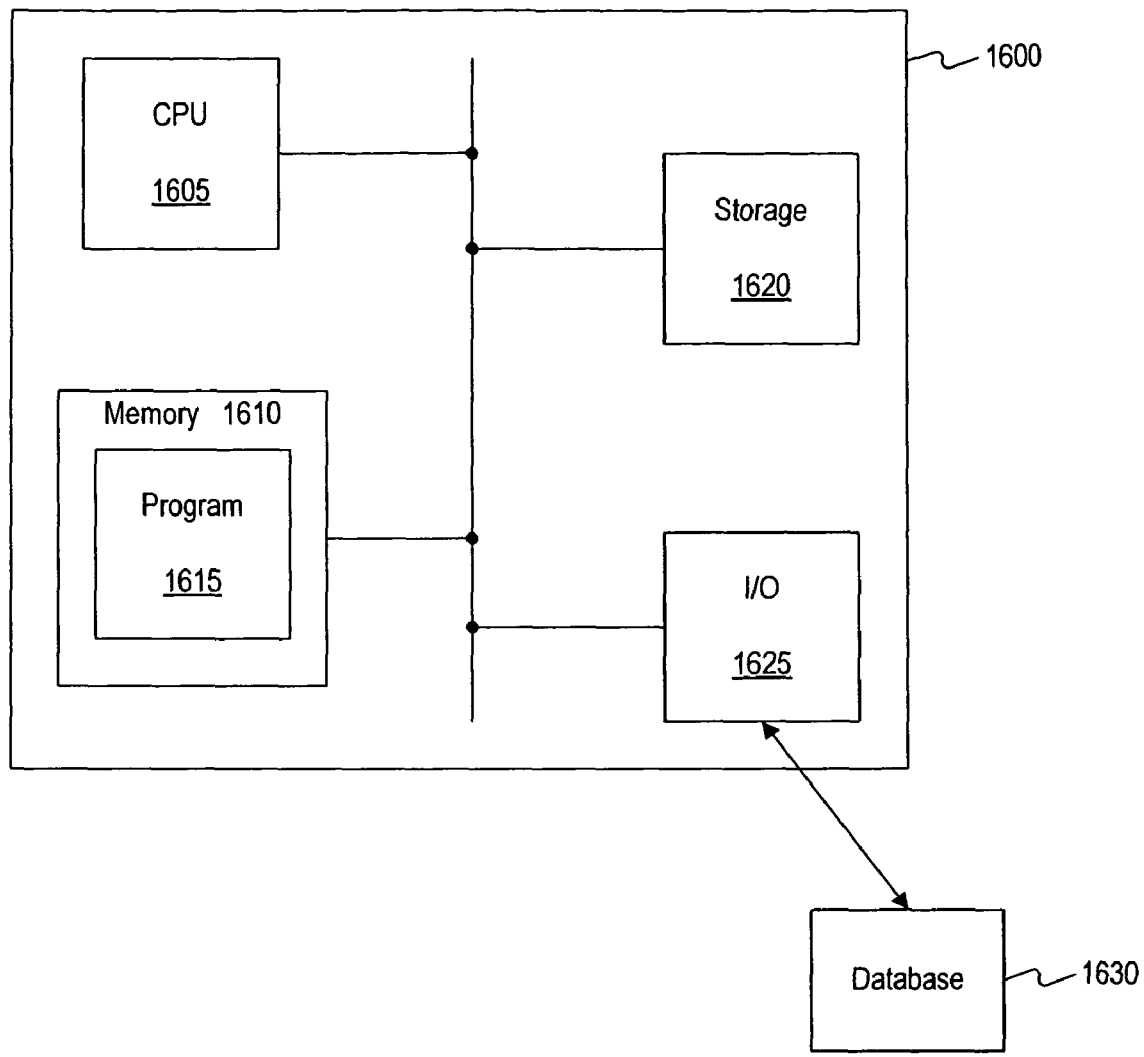
FIG. 16 illustrates an exemplary computing system suitable for implementing embodiments consistent with the invention.

FIG. 16 illustrates an exemplary computing system 1600 that may be used to implement embodiments of the invention. The components and arrangement, however, may be varied within principles of the present application.

Data processing or computing system 1600 includes a number of components, such as a central processing unit (CPU) 1605, a memory 1610, an input/output (I/O) device(s) 1625, a nonvolatile storage device 1620, and a database 1630. System 1600 can be implemented in various ways. For example, an integrated platform (such as a workstation, personal computer, laptop, etc.) may comprise CPU 1605, memory 1610, nonvolatile storage 1620, and I/O devices 1625. In such a configuration, components 1605, 1610, 1620, and 1625 may connect through a local bus interface and access database 1630 (shown implemented as a separate database system) via an external connection. This connection may be implemented through a direct communication link, a local area network (LAN), a wide area network (WAN) and/or other suitable connections. In some embodiments, database 1630 may be an embedded database, such that components 1605, 1610, 1620, and 1625 may access database 1630 through a retrieval library (not shown).

CPU 1605 may be one or more known processing devices, such as a microprocessor from the Pentium™ family manufactured by Intel™ or the Turion™ family manufactured by AMD™. Memory 1610 may be one or more storage devices configured to store information used by CPU 1605 to perform certain functions related to embodiments of the present application. Storage 1620 may be a volatile or non-volatile, magnetic, semiconductor, tape, optical, removable, non-removable, or other type of storage device or computer-readable medium. In one embodiment consistent with the invention, memory 1610 includes one or more programs or subprograms 1615 loaded from storage 1620 or elsewhere that, when executed by CPU 1605, perform various procedures, operations, or processes consistent with the present application. For example, memory 1610 may include various exemplary components included in second layer 120, such as reporting module 180, compiling module 190, scheduling module 200, automation library module 210, and repository 220 for performing their respective functions as described above.

Methods, systems, and articles of manufacture consistent with the present application are not limited to separate programs or computers configured to perform dedicated tasks. For example, memory 1610 may be configured with a program 1615 that performs several functions when executed by CPU 1605. For example, memory 1610 may include a single program 1615 that performs the functions of reporting module 180 and compiling module 190. Moreover, CPU 1605 may execute one or more programs located remotely from system 1600. For example, system 1600 may access one or more remote programs that, when executed, perform functions related to embodiments of the present application.

Memory 1610 may be also be configured with an operating system (not shown) that performs several functions well known in the art when executed by CPU 1605. By way of example, the operating system may be Microsoft Windows™, Unix™, Linux™, an Apple Computers operating system, Personal Digital Assistant operating system such as Microsoft CE™, or other operating system. The choice of operating system, and even to the use of an operating system, is not critical to the invention.

I/O device(s) 1625 may comprise one or more input/output devices that allow data to be received and/or transmitted by system 1600. For example, I/O device 1625 may include one or more input devices, such as a keyboard, touch screen, mouse, and the like, that enable data to be input from a user, such as concept information, status labels, database identifiers, etc. Further, I/O device 1625 may include one or more output devices, such as a display screen, CRT monitor, LCD monitor, plasma display, printer, speaker devices, and the like, that enable data to be output or presented to a user. I/O device 1625 may also include one or more digital and/or analog communication input/output devices that allow computing system 1600 to communicate with other machines and devices. System 1600 may input data from external machines and devices and output data to external machines and devices via I/O device 1625. In one embodiment, I/O device 1625 may include user interface 130. The configuration and number of input and/or output devices incorporated in I/O device 1625 are not critical to the invention.

System 1600 may also be communicatively connected to a database 1630. Database 1630 may comprise one or more databases that store information and are accessed and/or managed through system 1600. By way of example, database 1630 may be an Oracle™ database, a Sybase™ database, a DB2 database, or other relational database. Database 1630 may include, for example, data and information available in first layer 110, such as information describing applications that run on an exemplary mainframe environment. Systems and methods of the present application, however, are not limited to separate databases or even to the use of a database.

Other embodiments of the invention will be apparent to those skilled in the art from consideration of the specification and practice of the invention disclosed herein. It is contemplated that while the foregoing description sets forth different embodiments of web-integrated framework 100 for use in an exemplary mainframe environment, web-integrated framework 100 may be adapted for use in non-mainframe environments by configuring different components of web-integrated framework 100, including compiling module 190, etc. It is intended that the specification and examples be considered as exemplary only, with a true scope and spirit of the invention being indicated by the following claims. In that respect, features of the following examples may be implemented separately or in combination, thereby defining further methods and/or systems and/or specific embodiments thereof.

The present application may also relate to a product, in particular to a computer program product preferably stored on a computer readable memory and/or provided as a signal and/or as a data stream, comprising computer readable instructions, which when loaded in the memory of a computer and executed by the computer urge the computer to carry out the method according to the present application, in particular the computer implemented method as follows.

The present application may relate to a method, in particular to a method for identifying, in an organized fashion, a root cause of a failure in a mainframe environment that is running a plurality of interrelated applications, using a computer, comprising:

creating a repository storing information describing the plurality of interrelated applications from the mainframe environment, using the computer system;

identifying an application included in the plurality of interrelated applications that is associated with the failure in the mainframe environment;

determining a relationship between the application and the plurality of interrelated applications using the information in the repository;

displaying the relationship via a user interface; and identifying the root cause of the failure from the relationship.

Advantageously, the method provides an improved way of processing data and displaying data, in particular information data, thereby providing an improved graphical user interface. Based on the described way of data processing and data displaying a user does not need to create a job (e.g., a program) that will run a search routine in the mainframe environment to find application(s) that have caused the problem in the mainframe. Hence, further advantageously, there exists no uncertainty, whether the search routine may or may not retrieve the application(s) that actually caused the problem in the mainframe environment.

Further advantageously, the user does not need to retrieve several other applications that interrelate with the first application found by the search, and examine each application in order to isolate and identify the exact application(s) that caused the problem. Hence, the user does not need to use multiple screens to display the application data from the mainframe environment in order to correctly identify the different routines and/or jobs that are affected by and involved with the problem. Therefore, the method described in this application is more efficient because it is very fast, particularly compared a conventional search that may take several hours to run. In addition, the method described in this application is more efficient because of the improved graphical user interface avoiding displaying multiple applications on multiple isolated screens or windows, which in themselves provide no context or relational data to assist in understanding the problem.

Exemplary, the method may further comprise: updating the application in response to identifying the root cause of the failure.

Exemplary, the method may further comprise: updating the repository when an application among the plurality of interrelated applications is updated.

Exemplary, updating the repository may further comprise:

determining a relationship between the application that is updated in response to identifying the root cause of the failure and the plurality of interrelated applications to produce an updated relationship; and updating the repository with the updated relationship.

Hence, there is provided improved data processing that allows retrieving important data quickly, in order to identify and repair a failure.

Exemplary, determining the relationship may further comprise: determining a dependency relationship between the application and another application among the plurality of interrelated applications.

Therefore, the failure may be repaired in a dependable manner.

Exemplary, determining the relationship may further comprise: determining a frequency relationship between the application and another application among the plurality of interrelated applications.

Exemplary, identifying the application may further comprise: receiving an error information characterizing the failure in the mainframe environment; and identifying the application that generates the error information.

Exemplary, the method may further comprise:

modifying the application that is associated with the root cause of the failure to produce a modified application, wherein the application is a batch job;

simulating execution of the modified application; and outputting a result of the simulated execution.

Hence, the present application avoids the necessity of installing, configuring and executing a larger number of applications, in order to find an application that causes a failure. As a consequence, hardware resources are conserved, in particular network traffic and/or processor time and/or memory allocation may be kept low.

Exemplary, the method may further comprise: storing information representing the modified application in the repository if the result of the simulated execution indicates the root cause of the failure is resolved.

Exemplary, the method may further comprise: replacing the application that is associated with the root cause of the failure with the modified application in the mainframe environment.

Consequently, the mainframe environment may be administered in a fast and efficient manner, which otherwise would not be possible.

The present application may also relate to a system, in particular a computer based system for identifying, in an organized fashion, a root cause of a failure in a mainframe environment that is running a plurality of interrelated applications, comprising:

a memory; and a processor coupled to the memory, the processor being configured to create a repository storing information describing the plurality of interrelated applications from the mainframe environment, identify an application included in the plurality of interrelated applications that is associated with the failure in the mainframe environment, determine a relationship between the application and the plurality of interrelated applications using the information in the repository, display the relationship, and facilitate identifying the root cause of the failure from the relationship.

In other words, the system may comprise, among other things, a graphical user interface that provides improved display of content and/or information data to the user. This may be achieved by displaying efficiently, the necessary information regarding the application that causes the failure. Additionally, dependent applications may also be displayed. Consequently, the graphical user interface displays the internal state of the system, e.g. by displaying the applications that cause the failure, which may also include the dependent applications and/or
    displaying the error message and/or
    displaying respective source code.

Exemplary, the processor may further be configured to: provide tools to update the application in response to identifying the root cause of the failure.

Exemplary, the processor may further be configured to: provide tools to update the repository when an application among the plurality of interrelated applications is updated.

Exemplary, the processor may further be configured to:
    determine a relationship between the application that is updated in response to identifying the root cause of the failure and the plurality of interrelated applications to produce an updated relationship; and
    provide tools to update the repository with the updated relationship.

In view of the present application, in particular regarding the examples described herein, a "tool" may also be referred to "module".

Exemplary, the processor may further be configured to: determine a dependency relationship between the application and another application among the plurality of interrelated applications.

Exemplary, the processor may further be configured to: determine a frequency relationship between the application and another application among the plurality of interrelated applications.

Exemplary, the processor may further be configured to:
    receive an error information characterizing the failure in the mainframe environment; and
    facilitate identifying the application that generates the error information.

Exemplary, the processor may further be configured to:
    facilitate modifying the application that is associated with the root cause of the failure to produce a modified application, wherein the application is a batch job;
    simulate execution of the modified application; and
    output a result of the simulated execution.

Exemplary, the processor may further be configured to:
    store information representing the modified application in the repository if the result of the simulated execution indicates the root cause of the failure is resolved.

Exemplary, the processor may further be configured to:
    facilitate replacing the application that is associated with the root cause of the failure with the modified application in the mainframe environment.

The present application may further relate to a method, in particular to a method for identifying, in an organized fashion, a relationship between a plurality of interrelated applications in a mainframe environment, using a computer system, comprising:

creating a repository storing information describing the plurality of interrelated applications from the mainframe environment, using the computer system;
    identifying a target application included in the plurality of interrelated applications in the mainframe environment;
    determining a frequency and a dependency relationship between the application and the plurality of interrelated applications using the information in the repository; and
    displaying the relationship via a user interface.

Advantageously, the method provides an improved way of processing data and displaying data, in particular information data, thereby providing an improved graphical user interface.

Based on the described way of data processing and data displaying a user is able to visualize a comprehensive relationship between various interrelated applications. Thus, the method described in this application is more efficient because of the improved graphical user interface allowing the user to view the comprehensive relationship in a single user interface.

Exemplary, the method may further comprising:
    modifying the target application to produce a modified application, wherein the target application is a batch job;
    simulating execution of the modified application; and
    outputting a result of the simulated execution.

Exemplary, the method may further comprising:
    storing information representing the modified application in the repository if the result of the simulated execution indicates a desired result.

Exemplary, the method may further comprising:
    replacing the target application with the modified application in the mainframe environment.

Therefore, a user may modify a target application only if a simulated modification produces a desired result.

Exemplary, the method may further comprising:
    updating the repository when an application among the plurality of interrelated applications is updated.

Hence, when an application is modified, the repository is also updated without requiring other simulations and/or modifications, and thus improves the overall efficiency of the system.

What is claimed is:

1. A method for identifying a cause of a failure in a mainframe environment that is running a plurality of applications comprising:

storing, in a repository, information describing the plurality of applications;
    identifying one of the plurality of applications that is associated with the failure;
    determining a relationship between the identified application and the plurality of applications using the information in the repository;
    displaying the relationship via an interface;
    identifying the cause of the failure from the relationship;
    modifying the identified application to produce a modified application;
    simulating execution of the modified application; and
    outputting a result of the simulated execution.

2. The method of claim 1, further comprising:
    updating the identified application in response to identifying the cause of the failure.

3. The method of claim 1, further comprising:
    updating the repository when one of the applications is updated.

4. The method of claim 3, wherein updating the repository further comprises:
    determining a relationship between the updated application and the plurality of applications to produce an updated relationship; and
    updating the repository with the updated relationship.

5. The method of claim 1, wherein determining the relationship further comprises:
    determining a dependency relationship between the identified application and a second application among the plurality of applications.

6. The method of claim 1, wherein determining the relationship further comprises:
    determining a frequency relationship between the identified application and a second application among the plurality of applications.

7. The method of claim 1, wherein identifying an application further comprises:
   receiving error information characterizing the failure; and
   identifying the application that generates the error information.
8. The method of claim 1,
   wherein the identified application is a batch job.
9. The method of claim 1, further comprising:
   storing information representing the modified application in the repository if the result of the simulated execution indicates that the cause of the failure is resolved.
10. The method of claim 9, further comprising:
    replacing the identified application with the modified application.
11. A system for identifying a cause of a failure in a mainframe environment that is running a plurality of applications, comprising:
    a memory; and
    a processor coupled to the memory, the processor being configured to:
       store, in a repository, information describing the plurality of applications,
       identify one of the plurality of applications that is associated with the failure,
       determine a relationship between the identified application and the plurality of applications using the information in the repository,
       display the relationship,
       facilitate identifying the cause of the failure from the relationship,
       facilitate modifying the identified application to produce a modified application,
       simulate execution of the modified application, and
       output a result of the simulated execution.
12. The system of claim 11, wherein the processor is further configured to:
    provide tools to update the identified application in response to identifying the cause of the failure.
13. The system of claim 11, wherein the processor is further configured to:
    provide tools to update the repository when one of the applications is updated.
14. The system of claim 13, wherein the processor is further configured to:
    determine a relationship between the updated application and the plurality of applications to produce an updated relationship; and
    provide tools to update the repository with the updated relationship.
15. The system of claim 11, wherein the processor is further configured to:
    determine a dependency relationship between the identified application and a second application among the plurality of applications.
16. The system of claim 11, wherein the processor is further configured to:
    determine a frequency relationship between the identified application and a second application among the plurality of applications.
17. The system of claim 11, wherein the processor is further configured to:
    receive error information characterizing the failure; and
    facilitate identifying the application that generates the error information.
18. The system of claim 11, wherein the identified application is a batch job.
19. The system of claim 11, wherein the processor is further configured to:
    store information representing the modified application in the repository if the result of the simulated execution indicates that the cause of the failure is resolved.
20. The system of claim 19, wherein the processor is further configured to:
    facilitate replacing the identified application with the modified application.
21. A method for identifying a relationship between a plurality of applications in a mainframe environment comprising:
    storing, in a repository, information describing the plurality of application;
    selecting an application from the plurality of applications;
    determining a frequency and a dependency relationship between the selected application and the plurality of applications using the information in the repository;
    displaying the relationship via a user interface;
    modifying the selected application to produce a modified application;
    simulating execution of the modified application; and
    outputting a result of the simulated execution.
22. The method of claim 21, further comprising:
    storing information representing the modified application in the repository.
23. The method of claim 22, further comprising:
    replacing the selected application with the modified application.
24. The method of claim 23, further comprising:
    updating the repository when an application is updated.

* * * * *

UNITED STATES PATENT AND TRADEMARK OFFICE
CERTIFICATE OF CORRECTION

| | |
|---|---|
| PATENT NO. | : 8,117,500 B2 |
| APPLICATION NO. | : 12/453161 |
| DATED | : February 14, 2012 |
| INVENTOR(S) | : Ng |

It is certified that error appears in the above-identified patent and that said Letters Patent is hereby corrected as shown below:

On the Title Page,

Item (73) Assignee: "Accenture Global Services GmbH, Schaffhausen (CH)" should read --Accenture Global Services Limited, Dublin 4, IRELAND--

Signed and Sealed this
Fourteenth Day of May, 2013

Teresa Stanek Rea
*Acting Director of the United States Patent and Trademark Office*